(12) United States Patent
Wilds et al.

(10) Patent No.: US 11,884,019 B2
(45) Date of Patent: Jan. 30, 2024

(54) MAGNETIC ENCODING OF PHYSICAL OBJECTS IN AN ADDITIVE MANUFACTURING PROCESS

(71) Applicant: Raytheon Company, Waltham, MA (US)

(72) Inventors: Andrew M. Wilds, Tucson, AZ (US); Ryan D. White, Olathe, KS (US); Craig O. Shott, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 959 days.

(21) Appl. No.: 16/645,843

(22) PCT Filed: Sep. 5, 2018

(86) PCT No.: PCT/US2018/049514
§ 371 (c)(1),
(2) Date: Mar. 10, 2020

(87) PCT Pub. No.: WO2019/050922
PCT Pub. Date: Mar. 14, 2019

(65) Prior Publication Data
US 2020/0298493 A1 Sep. 24, 2020

Related U.S. Application Data

(60) Provisional application No. 62/556,846, filed on Sep. 11, 2017.

(51) Int. Cl.
*B29C 64/386* (2017.01)
*B33Y 10/00* (2015.01)
(Continued)

(52) U.S. Cl.
CPC .......... *B29C 64/386* (2017.08); *B29C 64/118* (2017.08); *B33Y 10/00* (2014.12);
(Continued)

(58) Field of Classification Search
CPC ......... B33Y 30/00; B33Y 40/20; B33Y 50/02; B33Y 50/00; B33Y 10/00; G11B 5/73917;
(Continued)

(56) References Cited

U.S. PATENT DOCUMENTS 5,492,572 A  2/1996  Schroeder et al.
5,545,367 A  8/1996  Bae et al.
(Continued)

FOREIGN PATENT DOCUMENTS

EP   2565022     3/2013
WO   2015188175  12/2015
(Continued)

OTHER PUBLICATIONS

International Search Report and Written Opinion for corresponding International Application PCT/US2018/049514 dated Dec. 18, 2018.
(Continued)

*Primary Examiner* — Monica A Huson
*Assistant Examiner* — Kelsey C Grace
(74) *Attorney, Agent, or Firm* — Renner, Otto, Boisselle & Sklar LLP

(57) ABSTRACT

A method of encoding information in an object that may allow for enhanced tailorability of the encoding during the processing and/or also enhance the amount of information encoded in the object. More particularly, the method of encoding the object enables the magnetic characteristics at different spatial locations of the object to be modified to form a spatial array of the different magnetic characteristics for representing the encoded information. The method can be used to permanently embed a magnetic signature in a non-magnetic object, for example. More specifically, the method allows different portions of the object to exhibit different magnetic characteristics at each spatial location of (Continued)

the object in three dimensions, and more particularly configuring the magnetic vectors of those portions in many possible orientations with a 4n steradian solid angle and/or with different intensities.

18 Claims, 11 Drawing Sheets

(51) Int. Cl.
| | |
|---|---|
| B33Y 30/00 | (2015.01) |
| B33Y 50/00 | (2015.01) |
| B29C 64/118 | (2017.01) |
| G11B 5/73 | (2006.01) |
| B33Y 40/20 | (2020.01) |
| G05B 19/4099 | (2006.01) |
| G06Q 50/04 | (2012.01) |
| G11B 5/848 | (2006.01) |
| G11B 5/852 | (2006.01) |
| B29K 55/02 | (2006.01) |
| B29K 67/00 | (2006.01) |

(52) U.S. Cl.
CPC ............ *B33Y 30/00* (2014.12); *B33Y 40/20* (2020.01); *B33Y 50/00* (2014.12); *G05B 19/4099* (2013.01); *G06Q 50/04* (2013.01); *G11B 5/73917* (2019.05); *G11B 5/848* (2013.01); *G11B 5/852* (2013.01); *B29K 2055/02* (2013.01); *B29K 2067/046* (2013.01); *B29K 2995/0008* (2013.01); *G05B 2219/35134* (2013.01); *G05B 2219/49023* (2013.01)

(58) Field of Classification Search
CPC ....... G11B 5/848; G11B 5/852; B29C 64/118; B29C 64/106; B29C 64/386; B29C 70/62; B29C 64/393; G06Q 50/04; G05B 19/4099; G05B 2219/49023; G05B 2219/35134; B29K 2055/02; B29K 2067/046; B29K 2995/0008
See application file for complete search history.

(56) References Cited

U.S. PATENT DOCUMENTS

| | | | |
|---|---|---|---|
| 5,631,093 | A | 5/1997 | Perry et al. |
| 6,029,895 | A | 2/2000 | Ito et al. |
| 9,552,542 | B2 * | 1/2017 | Boday .................... G06K 1/121 |
| 9,623,604 | B2 | 4/2017 | Glazberg et al. |
| 2002/0081461 | A1 | 6/2002 | Nishikawa et al. |
| 2004/0178274 | A1 | 9/2004 | Wu et al. |
| 2015/0321420 | A1 | 11/2015 | Karpas et al. |
| 2016/0031157 | A1 | 2/2016 | Reep et al. |
| 2016/0375492 | A1 | 12/2016 | Bencher et al. |
| 2017/0136699 | A1 | 5/2017 | Erb et al. |
| 2017/0220835 | A1 | 8/2017 | Glazberg et al. |

FOREIGN PATENT DOCUMENTS

| | | | |
|---|---|---|---|
| WO | WO-2015188175 A1 * | 12/2015 | ............ B22F 10/10 |
| WO | 2016097911 | 6/2016 | |
| WO | 2016209823 | 12/2016 | |
| WO | 2017100271 | 6/2017 | |

OTHER PUBLICATIONS

Koslow, Tyler; "Polymagnets: Showing Us the Possibility of 3D Printing Magnetic Fields"; 3D Printing Industry; Mar. 24, 2016; [online] <URL: https://3dprintingindustry.com/news/polymagnets-showing-us-the-possibility-of-3d-printing-magnetic-fields-75254/>; made available Jun. 29, 2017.

Jackson, Beau; "3D Printing Harnesses the Power of Magnets"; 3D Printing Industry; Oct. 25, 2016; [online] <URL: https://3dprintingindustry.com/news/3d-printing-harnesses-power-magnets-97395/>; made available Jun. 29, 2017.

Hipolite, Whitney; "Magic of Magnets: You Can Now 3D Print Your Own Anti-Gravitator to Amaze Your Friends"; 3Dprint.com, 3DR Holdings, LLC; Jul. 29, 2015; [online] <URL: https://3dprint.com/85325/3d-printed-anti-gravitator/>; made available Jun. 29, 2017.

Scott, Clare; "ORNL Researchers 3D Print Permanent Magnets for Clean Energy Applications, Saving Time, Cost and Material"; 3Dprint.com, 3DR Holdings, LLC; Nov. 2, 2016; [online] <URL: https://3dprint.com/154219/ornl-3d-printed-magnets-baam/>; made available Jun. 29, 2017.

Buren, Alec; "Revolutionary 3D printed magnets by Polymagnet can change engineering as we know it"; 3ders.org; Mar. 24, 2016; [online] <URL: https://www.3ders.org/articles/20160324-revolutionary-3d-printed-magnets-by-correlated-magnetics-can-change-engineering.html>; made available Jun. 29, 2017.

Polymagnet, Correlated Magnetics; "About Polymagnets"; [online] <URL: http://www.polymagnet.com/polymagnets/> made available Jun. 29, 2017.

RuBee, Viable Assets, Inc.; [online] <URL: https://www.ru-bee.com/> made available Jun. 29, 2017.

Wikipedia, Wikimedia Foundation, Inc.; "RuBee"; [online] <URL: https://en.wikipedia.org/wiki/RuBee> made available Jun. 29, 2017.

Szielasko, Klaus et al.; "Fingerprint signatures based on nanomagnets as markers in materials for tracing and counterfeit protection"; May 12, 2016; Journal of Nanoparticle Research vol. 18, issue 5.

* cited by examiner

MAGNETIC ENCODING OF PHYSICAL OBJECTS IN AN ADDITIVE MANUFACTURING PROCESS

RELATED APPLICATIONS

This application is a national phase of International Application No. PCT/US2018/049514 filed on Sep. 5, 2018 and published in the English language, which claims the benefit of U.S. Provisional Application No. 62/556,846 filed Sep. 11, 2017, both of which are hereby incorporated herein by reference in their entirety.

TECHNICAL FIELD

The present disclosure relates generally to magnetic encoding, and more particularly to embedding information via magnetic encoding of one or more portions of a physical object, such as for providing a unique magnetic signature corresponding to the object, which may be utilized for identification, authentication, traceability, data storage, or the like.

BACKGROUND

Data encoding is a technique for adding a representation of information into an object. For example, a unique identification can be added to the object by printing a barcode encoding a unique number corresponding to the object. Another example of data embedding involves quick response (QR) codes, which provide machine-readable codes that are visible and may be used to convey information such as uniform resource locators. For data storage, information is typically stored in concentric data tracks on a magnetic disc surface, in which magnetic flux reversals are encoded on the disc surface within the selected data track. For example, in non-return-to-zero-inverse (NRZI) encoding, a digital "one" is represented by a magnetic flux reversal from one magnetic domain to the next in the data track, and a digital "zero" is represented by a lack of a magnetic flux reversal from one magnetic domain to the next.

SUMMARY

One problem associated with the foregoing encoding techniques is that the amount information encoded is limited to binary representations of the information which limits the amount of information that can be stored on the object. In addition, the foregoing techniques are typically limited by how the information is encoded during the processing of the object.

The present disclosure provides a unique method of encoding information in an object that may allow for enhanced tailorability of the encoding during the processing and/or also enhance the amount of information encoded in the object.

More particularly, the method of encoding the object enables the magnetic characteristics at different spatial locations of the object to be modified to form a spatial array of the different magnetic characteristics for representing the encoded information. In this manner, the method can be used to permanently embed a magnetic signature in a non-magnetic object, for example.

More specifically, the method allows different portions of the object to exhibit different magnetic orientations at different spatial locations of the object in three dimensions, and more particularly may allow these different portions to have many possible magnetic vector orientations with a $4\pi$ steradian ($4\pi$ sr) solid angle, which may enable those portions to have an enhanced amount of information. This allows the magnetic signature to be very complex compared to traditional binary encoding, thus creating a unique fingerprint in the object that can be measured by a decoder, such as a magnetometer, for use in identification, authentication, tracking, or the like.

Generally, at least a portion of the object may be defined by volume units (voxels) having magnetic domains. During the processing, at least some of the voxels may be exposed to a reconfigurable external magnetic field, whereby the magnetic field orients the magnetic domains within the voxels in the same magnetic direction as the external field and/or with an intensity that is proportional to the external field so as to provide the different magnetic characteristics at the different spatial locations of the object in response to changing directions and/or intensity of the magnetic field. In this manner, as the many possible directions and/or intensities of the external magnetic field changes at different spatial locations of the object, the voxels and/or magnetic domains at those different spatial locations will have different magnetic characteristics to form a spatial array of the different magnetic characteristics that represents the encoded information in the object.

In exemplary embodiments, each voxel of the material exposed to the external magnetic field may contain at least one particle having one or more of the magnetic domains that can be induced (or reconfigured) with permanent magnetism via exposure to the external magnetic field. In exemplary embodiments, the external magnetic field may be configured with an intensity that induces (or reconfigures) this permanent magnetism into the magnetic domain(s) of the respectively exposed particles without causing movement of each respective particle relative to its surrounding base material. Such a configuration may permit the magnetic encoding of the object while minimizing distortion of the object which otherwise could occur if the particles were caused to move through the surrounding matrix material during processing.

The physical object may be encoded during any number of processing methods with a variety of materials, including plastics, metals, ceramics and/or composites.

In exemplary embodiments in which the object is at least partially made of a non-metallic base material, the non-metallic material may include particles, such as metallic particles, having magnetic domains that are permanently magnetizable or reconfigurable for encoding.

In exemplary embodiments, the non-metallic material may be flowable above a particular temperature (e.g., a glass transition temperature (Tg)). In this case, the exemplary method of encoding may include modifying the magnetic characteristics by heating portions of the material above a particular temperature (e.g., Tg) to a flowable state, and then exposing the metallic particles in that region to an external magnetic field to configure the magnetic domains of the particles in that region (and/or voxels containing those metallic particles) in the same magnetic direction as the external magnetic field and/or with an intensity that is proportional to the external magnetic field. Thereafter, upon cooling that portion of the material below the particular temperature (e.g., Tg), the magnetic domains remain permanently oriented in the direction of the magnetic field and/or with a proportional intensity in such a way that a permanent magnetic signature is created by the array of different magnetic orientations and/or intensities at the different spatial locations of the object.

In exemplary embodiments, the external magnetic field is configured with an intensity that induces permanent magnetism into the magnetic domains of the respectively exposed metallic particles without causing movement of the metallic particles relative to the surrounding flowable non-metallic base material, thereby minimizing distortion of the object.

In exemplary embodiments in which the object is at least partially made of a metallic base material, the metallic material may include magnetic domains as part of the metallic grains of the material. In this case, the exemplary method may include modifying the magnetic characteristics by heating portions of the material to a particular temperature, and then exposing the magnetic domains in that region to an external magnetic field to configure the magnetic domains of the material in that region (and/or voxels containing metallic grains of the material) in the same magnetic direction as the external magnetic field and/or with an intensity that is proportional to the external magnetic field. Thereafter, upon cooling that portion of the material below the particular temperature, the magnetic domains remain permanently oriented in the direction of the magnetic field and/or with a proportional intensity in such a way that a permanent magnetic signature is created by the array of different magnetic orientations and/or intensities at the different spatial locations of the object.

During such process(es), the portion of the object being processed at a given time may be relatively small relative to the remainder of the object, which creates an opportunity to modify the magnetic characteristics of the magnetic domains and/or voxels in that area to provide a high-resolution magnetic signature across the object. The exemplary method may be utilized during the formation of a new object, or may be utilized to embed a magnetic signature in an existing object, or may be utilized to modify an existing magnetic signature in an existing object.

Traditionally, in order to ensure the authenticity or quality of an object, the object is tracked throughout the entire manufacturing logistics chain, starting at manufacturing, through shipping/logistics, and then being received by consumers. This may come at a heavy cost impact, and also may necessitate the use of a select group of manufacturers to conduct the work, which often has adverse cost and scheduling implications.

In exemplary embodiments, the method according to the present disclosure allows the object embedded with the magnetic signature to be created by non-traditional manufacturers and scanned throughout the logistics chain, which may save time and money, improve quality, enhance traceability, and enhance the number of available options for manufacturing. In addition, the magnetic signature embedded directly in the object may be difficult to understand, modify, or interpret without a program specific algorithm. Therefore, this particular algorithm for encoding and/or decoding the information now may shift the emphasis for authenticity, quality or traceability out of the manufacturing domain.

According to one aspect of the present disclosure, a method of encoding a physical object includes: (i) obtaining information to encode in the object; and (ii) processing the object, wherein during the processing, the magnetic characteristics of at least a portion of the object are modified at different spatial locations of the object to form a spatial array of different magnetic characteristics in the object that represents the encoded information.

According to another aspect of the present disclosure, a method of encoding a physical object during additive manufacturing of the object includes: providing a computer model of the object that includes instructions to additively manufacture at least a portion of the object, and includes instructions to encode at least a portion of the object with information; additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and encoding the object with the information according to the model; wherein the encoding is performed during the additive manufacturing; and wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, and wherein, during the encoding, the magnetic vector direction and/or magnetic vector intensity of the external magnetic field is varied at the different spatial locations of the object to form a spatial array of different magnetic characteristics in the object that represents the encoded.

According to another aspect of the present disclosure, a method of encoding a physical object during additive manufacturing of the object includes: providing a computer model of the object that includes instructions to additively manufacture at least a portion of the object, and includes instructions to encode at least a portion of the object; additively manufacturing the object according to the model, wherein the object is at least partially formed by a plurality of voxels of material disposed at different spatial locations of the object along three-dimensions; and encoding the object with the information according to the model; wherein the encoding is performed during the additive manufacturing; and wherein the encoding includes exposing at least some of the voxels at the different spatial locations of the object to the external magnetic field, the external magnetic field having a magnetic vector direction and a magnetic vector intensity that modifies the magnetic characteristic of the respective voxels at the different spatial locations of the object to form a spatial array of different magnetic characteristics in the object that represents the encoded information; wherein each respective voxel that has its magnetic characteristic modified contains at least one particle surrounded by base material, in which the at least one particle has magnetic domains that are modifiable via exposure to the external magnetic field to provide the modified magnetic characteristic of the voxel; and wherein the encoding includes modifying the magnetic characteristic of each respective voxel independent of movement of the at least one particle in the voxel relative to the surrounding base material.

According to another aspect of the present disclosure a system for encoding a physical object during additive manufacturing of the object includes: a non-transitory computer readable medium containing instructions to additively manufacture at least a portion of the object, and containing instructions to encode at least a portion of the object with information; an additive manufacturing apparatus for additively manufacturing the object, wherein the additive manufacturing apparatus is configured to at least partially form the object with a plurality of voxels of material disposed at different spatial locations of the object along three-dimensions; an encoder configured to encode the information in the object during the additive manufacturing, the encoder comprising a magnetic field generator that generates an external magnetic field having a magnetic vector direction and a magnetic vector intensity; and a controller for controlling the additive manufacturing and the encoding, wherein the controller is configured to perform at least the steps of: during the additive manufacturing, exposing at least some of the voxels at the different spatial locations of the object to the external magnetic field, the magnetic vector direction and the magnetic vector intensity of the magnetic field being configured to induce permanent magnetism into the magnetic domains of the respectively exposed voxels, such that the magnetic domains retain a magnetic vector orientation in the same direction as the magnetic vector direction of the external magnetic field and/or retain a magnetic vector intensity proportional to the magnetic vector intensity of the external magnetic field, and during the encoding, varying the magnetic vector direction and/or magnetic vector intensity of the external magnetic field at the different spatial locations of the object to form a spatial array of different magnetic characteristics in the object that represents the encoded information.

Other aspects according to the present disclosure include one or more of the following:

The aspect of creating a magnetic signature for encoding on an object. This includes designing the signature either as a raw or encoded signature. This also includes encoding the signature for physical implementation on the object, again either as raw or encoded information.

The aspect of embedding a magnetic signature on a physical object. This includes the method of imparting the physical signature, which may be on a new build or for modifying an existing build.

The aspect of reading the magnetic signature from the physical object. This also includes translating the magnetic signature and outputting the information for a machine or person to read the information.

The following description and the annexed disclosure, including figures and drawings which are not necessarily to scale, show various aspects and set forth certain illustrative embodiments according to the present disclosure. The exemplary embodiments are indicative, however, of but a few of the various ways in which the principles according to the present disclosure may be employed. Other objects, advantages and novel features according to aspects of the disclosure are apparent from the foregoing detailed description when considered in conjunction with the annexed disclosure, figures, and drawings

BRIEF DESCRIPTION OF THE DRAWINGS

The annexed drawings, which are not necessarily to scale, show various aspects according to the present disclosure.

DETAILED DESCRIPTION

The present disclosure provides a unique method of encoding information in an object that may allow for enhanced tailorability of the encoding during the processing of the object and/or also enhance the amount of information encoded in the object. More particularly, the method of encoding the object enables the magnetic characteristics at different spatial locations of the object to be modified, such as during additive manufacturing, to thereby form a spatial array of the different magnetic characteristics for representing the encoded information. The method can be used to permanently embed a magnetic signature in a non-magnetic or non-metallic object, or in a metallic object, for example.

Figure 1:
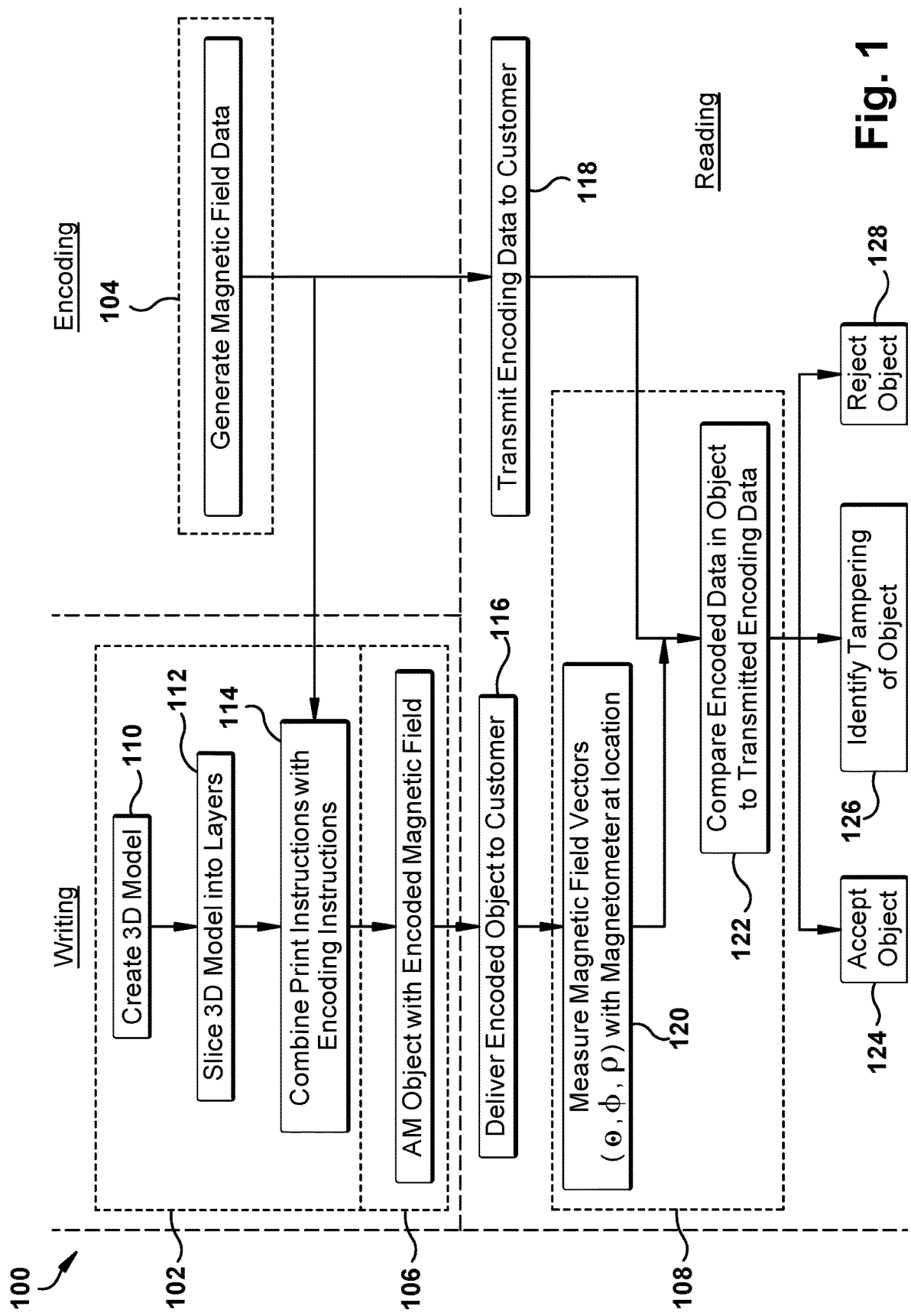
FIG. 1 is a flow diagram illustrating an exemplary method of encoding a physical object during additive manufacturing according to the present disclosure.

More specifically, the method allows different portions of the object to exhibit different magnetic characteristics at each spatial location of the object in three dimensions, and more particularly configuring the magnetic vectors of those portions in many possible orientations with a 4π steradian solid angle and/or with different intensities. This allows the magnetic signature to be relatively complex, thus creating a unique fingerprint in the object for use in identification, authentication, tracking, or the like The principles and aspects according to the present disclosure have particular application to systems, apparatus, and methods that augment so called "3D printed" or Additively Manufactured (AM) components by creating volumes of aligned magnetic fields within components to act as an identifying feature or set of features to differentiate two, or more, otherwise identical components. Referring briefly to FIG. 1, such a method generally can be broken down into three elements: encoding, writing, and reading of magnetically encoded volumes. Further motivating this concept is a desire to make these features native to the object. In other words, the objects may be composed of a series of volume elements, which are themselves features, and which are non-separable from the object and immutable under normal conditions. This concept takes advantage of the materials properties for both the base material (e.g., non-metallic) and the metallic and/or magnetic dopant contained in the base material. It is understood, however, that the principles and aspects according to the present disclosure may be applicable with other materials and/or other processes where it is desirable to magnetically encode various portions of the object.

Additive Manufacturing

Additive manufacturing (AM) has many forms, including, for example, stereolithography (SLA), powder bed fusion (PBF), direct metal deposition (DMD), fused filament fabrication (FFF), and the like. Each method has a range of materials which can be utilized successfully. The focus of the description below will be on thermoplastic-filament extrusion type systems, although it is understood that other forms of additive manufacturing may be utilized as understood by those having ordinary skill in the art.

In a typical additive manufacturing system, the user designs an object in three-dimensional (3D) Computer Aided Design (CAD) software. The resulting file is then processed through a "slicer," a tool which creates instructions for the 3D printer (AM apparatus) to print the object. The slicer takes the material type, the printer type and configuration, the nominal extrusion temperatures, feed rate, and other details into consideration when creating the file to print an object.

Figure 2:
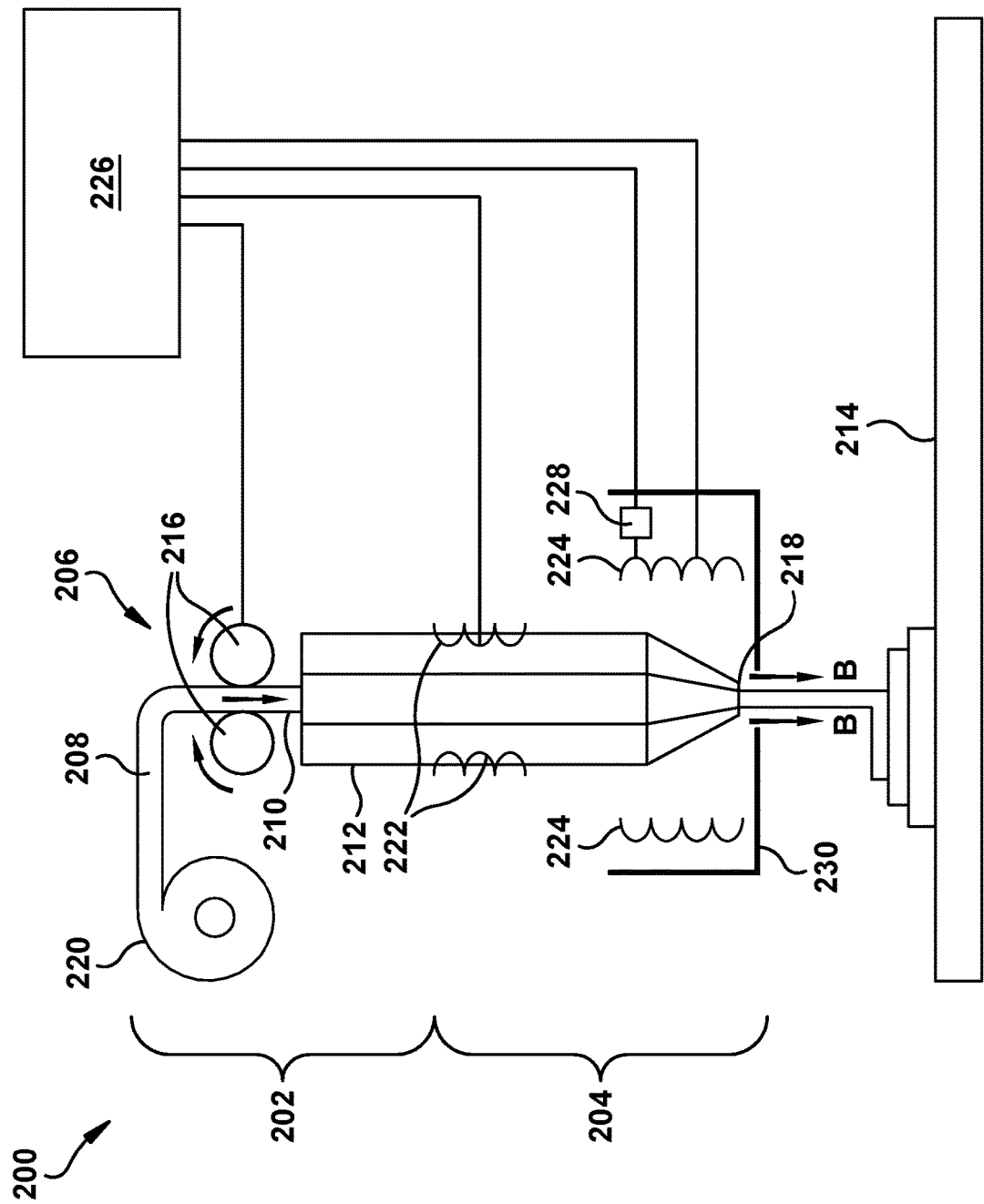
FIG. 2 is a schematic illustration of an exemplary additive manufacturing and encoding system according to the present disclosure.

FIG. 2 depicts the functional components of an exemplary additive manufacturing system 200, which will be described in further detail below. Generally, the system 200 is composed of a so-called "cold end" 202 where a solid filament is stored and drawn into an extruder, and a so-called "hot end" 204 wherein the filament is heated, pushed through a nozzle (typically much smaller than the filament diameter), and extruded onto a print bed to build an object in "slices" (or layers).

There are various types of materials that may be utilized in additive manufacturing processes. Common among these materials are thermoplastics, which are often used in fused-filament fabrication additive manufacturing. Thermoplastics remain solid until the processing temperature is raised above the glass transition temperature (Tg) at which point they will start to flow, and can be extruded. A second temperature, called the Heat Damage Threshold (HDT) exists above Tg. A thermoplastic exceeding the HDT will warp during the printing process which is not a desirable state because the resulting 3D printed object will be warped, slumped, or otherwise distorted. Different materials will have different Tg and HDT temperatures, and also may cool at a different rates. It is furthermore noted that adding materials to the thermoplastic could alter this rate of cooling to be faster, or slower, than the base material itself, as will be discussed in further detail below.

Typical thermoplastics for 3D printing include acrylonitrile butadiene styrene (ABS) and polylactic acid (PLA). In the various exemplary embodiments discussed herein, the focus will be on ABS and PLA because their properties are well-suited for the application of magnetic encoding during additive manufacturing. In addition, it is noted that there exist a number of specialty filaments that utilize ABS or PLA as a base material and which contain additives (such as natural fibers, metal particles, etc.) that may be utilized in the exemplary method(s) according to the present disclosure. It will of course be appreciated that although certain embodiments may utilize such materials, other types of materials may be utilized depending on the additive manufacturing technique and/or application, as would be understood by those having ordinary skill in the art.

Magnetism

There are several types of magnetism that can be attributed to a material. The two most predominant types of magnetism include ferromagnetism and paramagnetism. Other less common types include ferrimagnetism, anti-ferromagnetism, and diamagnetism. Each of these forms of magnetism has a unique set of properties which may be exploited for various purposes, and any of these types may be utilized in the exemplary method(s) described below.

Some common terms associated with magnetism include: (1) "Curie Temperature" ($T_C$), which is the temperature above which ferri- and ferromagnetic materials lose their permanent magnetic properties and behave like paramagnetic materials; (2) "Neel Temperature" ($T_N$), which is the temperature above which anti-ferromagnetic materials transition to behaving like paramagnetic materials; (3) "Magnetic Susceptibility" ($\chi$), which relates to how strongly a material interacts with a magnetic field, in which positive susceptibility is aligned parallel to the applied magnetic field, and negative susceptibility is aligned anti-parallel to the magnetic field; (4) "Magnetic Domain," which is a collection of dipoles in the material with a common orientation. Magnetic Domains are typically very small in size, such that a single crystal grain will typically contain many magnetic domains.

Figure 3A:
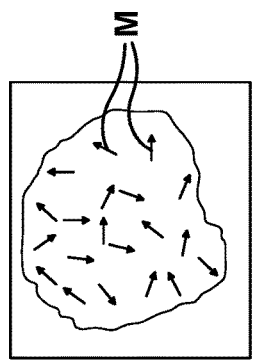
FIG. 3A illustrates a paramagnetic material without exposure to an external magnetic field.
Figure 3B:
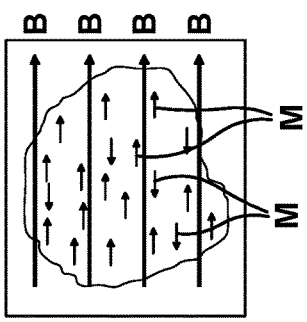
FIG. 3B illustrates a paramagnetic material exposed to an external magnetic field.

Paramagnetic materials tend to be weakly magnetic and weakly attracted to external magnetic fields (positive susceptibility). As shown in the illustration of FIGS. 3A and 3B, paramagnetic materials will respond to an external magnetic field (shown with vectors designated "B" in FIG. 3B) by orienting the magnetic moments ("m") of the material in the same direction. However, paramagnetic materials will not retain any permanent magnetism absent the magnetic field. Most elements and materials are either weakly paramagnetic or weakly diamagnetic (see below). These materials owe their properties to unpaired electrons which interact with the external magnetic field.

Figure 4A:
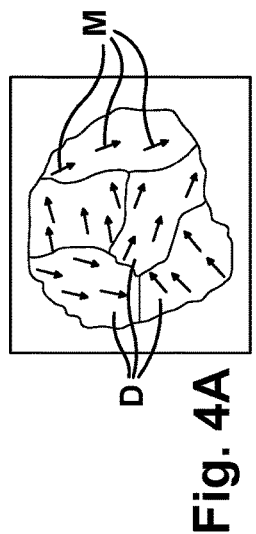
FIG. 4A illustrates a ferromagnetic material without exposure to an external magnetic field.
Figure 4B:
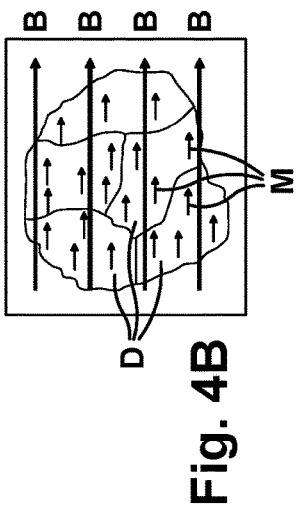
FIG. 4B illustrates a ferromagnetic material exposed to an external magnetic field.

Ferromagnetic materials are strongly magnetic, and form strong permanent magnets which are attracted to the external magnetic field (positive susceptibility). As shown in the illustration of FIGS. 4A and 4B, the dipoles of these materials tend to form zones (magnetic domains ("D") which are composed of many atoms ($>10^{12}$), and which have magnetic moments ("m") that point in the same direction in response to an external magnetic field (shown with vectors designated "B" in FIG. 4B). Left alone, these dipoles tend to be randomly oriented (FIG. 4A), which is why ferromagnetic materials in nature have very weak net magnetic fields, but still respond strongly to external magnetic fields (FIG. 4B). When raised above the Curie Temperature ($T_C$), ferromagnetic materials undergo a magnetic state transition and become paramagnetic.

Figure 5A:
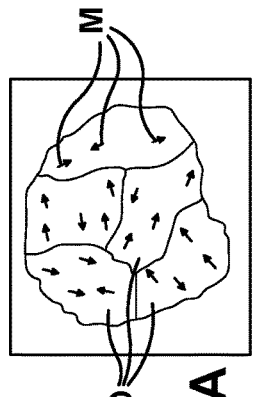
FIG. 5A illustrates a ferrimagnetic material without exposure to an external magnetic field.
Figure 5B:
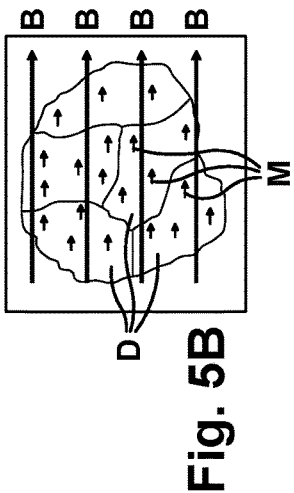
FIG. 5B illustrates a ferrimagnetic material exposed to an external magnetic field.

Ferrimagnetic materials are similar to ferromagnetic materials, as shown in the illustration of FIGS. 5A and 5B. With both ferrimagnetic and ferromagnetic materials, the material can be permanently magnetized when below $T_C$ and is paramagnetic above $T_C$. Ferrimagnetic materials exhibit a much weaker magnetization than ferromagnetic materials, which is attributed to its magnetic moments ("m") coupling in both parallel and anti-parallel orientations (FIG. 5B), which reduces the net magnetic moment. When working with ferrimagnetic materials, another parameter of interest is the magnetization compensation point (MCP). The MCP is a temperature slightly below $T_C$ where the parallel and anti-parallel oriented modes balance, creating a net-zero magnetic moment in the material. Ferrimagnetic materials also have much higher resistivity than ferromagnetic materials, which may lend to various practical applications as would be understood by those having ordinary skill in the art.

Figure 6A:
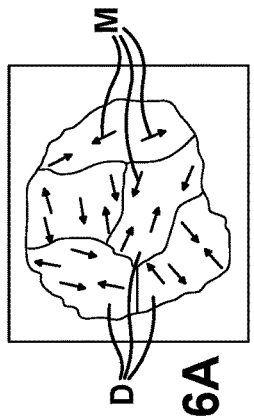
FIG. 6A illustrates an anti-ferromagnetic material without exposure to an external magnetic field.
Figure 6B:
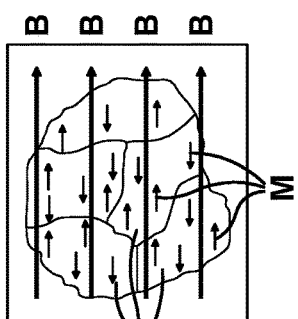
FIG. 6B illustrates an anti-ferromagnetic material exposed to an external magnetic field.

Anti-ferromagnetic materials have magnetic moments which align parallel and anti-parallel, as illustrated in FIGS. 6A and 6B, which means these materials are non-magnetic below the Néel temperature ($T_N$). Above $T_N$, these materials behave as though paramagnetic.

Figure 7A:
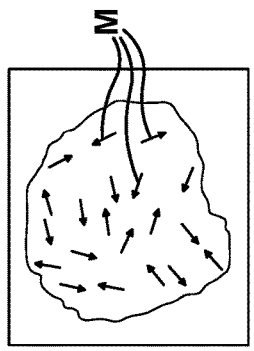
FIG. 7A illustrates a diamagnetic material without exposure to an external magnetic field.
Figure 7B:
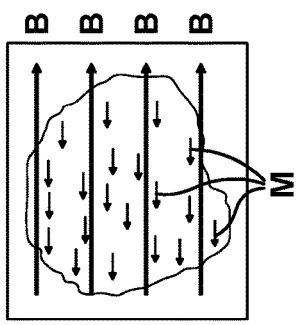
FIG. 7B illustrates a diamagnetic material exposed to an external magnetic field.

Diamagnetic materials tend to be weakly magnetic and weakly repelled by magnetic fields (negative susceptibility). As illustrated in FIGS. 7A and 7B, diamagnetic materials will respond to an external magnetic field (shown with vectors designated "B" in FIG. 7B), however, they will not retain any permanent magnetism because all of their electrons are paired. Superconductors fall into this class of magnetic materials and exhibit exceedingly strong diamagnetism. Most elements and materials are either weakly paramagnetic or weakly diamagnetic.

It is to be understood that non-magnetic materials do not actually exist. Materials which are normally considered non-magnetic are actually weakly paramagnetic or diamagnetic and therefore do not retain magnetic fields. In the presence of external magnetic fields (even very strong fields such as those found in a magnetic resonance imaging (MRI)) such materials react so weakly as to be practically considered as non-magnetic.

A magnetic material subjected to a magnetic field will have induced magnetization roughly proportional to the magnetic field strength, as provided by Curie's Law (Eq. 1) and the Curie-Weiss Law (Eq. 2).

$$M = C \cdot \frac{B}{T} \quad \text{(Eq. 1)}$$

$$\chi = \frac{C}{T - T_C} \quad \text{(Eq. 2)}$$

where: M is the magnetization (magnetic moment/volume); C is the material specific Curie constant; B is the magnetic field, measured in Tesla; and T is the temperature, measured in Kelvin.

The process of inducing and retaining permanent magnetism in a material is statistical in nature, and is at least partially driven by the magnetic fields in a given item's environment. As shown in Eq. 1, for example, increasing the magnetic field strength is one way to increase the likelihood of an induced permanent magnetic field in the material.

By the formulation of these laws, it is also clear that temperature has an effect on inducing permanent magnetism into an unmagnetized material. Specifically, as the temperature gets closer to $T_C$ the material becomes more susceptible to being magnetized. This property is seen in a common elementary experiment where a nail or paperclip is heated, followed by running the object over a magnet. As the object cools the magnetic field has been locked in and the object is now magnetized.

Magnetic Encoding

In view of the foregoing considerations, exemplary system(s), apparatus, and method(s) of encoding physical objects according to the present disclosure will be described in further detail below.

Referring to FIG. 1, an exemplary method 100 of encoding a physical object is shown. As shown, the method 100 generally includes the steps of writing, encoding, and reading one or more portions of a physical object. These steps can be further refined into the steps of: obtaining information to encode in the object (step 102), processing the object (step 104), encoding the object (step 106), and decoding the object (step 108).

As shown in the illustrated embodiment at step 102, the obtaining information to encode in the object may begin at step 110 with creating a 3D CAD model of the object. At step 112, the resulting file is then processed through a "slicer," which is a software tool which creates instructions for the apparatus to additively manufacture the object. At step 114, these print instructions are combined with instructions for magnetically encoding portions of the object. This may include instructions having the magnetic field parameters ($\Theta$, $\Phi$, $\rho$) for encoding the object, which is discussed in further detail below.

The information may be obtained and may be stored in a storage device of an exemplary system that carries out the steps of method 100. For example, the information may be in the form of a predetermined algorithm provided by the proprietor of the object with instructions for how to encode the information in the object. In this manner, the information may contain information about the manufacturing process of the object, including where and how information in the object is to be encoded with the information. In exemplary embodiments, the information may be related to the identification of the object, authentication as to the source of the object, traceability to the source of the object, or the like. The information also can be data encoded on the object, such that the object is a non-transitory computer readable medium having the encoded information. In exemplary embodiments, the information may be a part number, a product number, a brand name, any data relevant for the product identification, licensing information, identification of a licensee, a combination thereof, or the like. The information may be obtained from a user, from a digital repository, or the like.

In exemplary embodiments, the process may include an additive manufacturing process in which case the information may include a model for the object and/or fabrication instructions for the object. An object model may be any computer-readable file or files that collectively specify the structure, materials, and/or colors of the object. This may, for example include CAD files, STL files, and the like that provide three-dimensional descriptions of the object. Fabrication instructions corresponding to a model may be any collection of instructions that, when carried out by an additive manufacturing apparatus or three-dimensional printer, result in the fabrication of the object. For example, fabrication instructions may include a series of instructions for moving to various x,y,z coordinates, extruding build material, controlling temperature, feed rate, and the encoding (such as via applying an external magnetic field) as discussed in further detail below.

At step 104, the object is encoded via a magnetic field, such as an external magnetic field generated by a magnetic field generator. The generated magnetic field may be based upon magnetic field data stored in the encoding instructions. At step 106, the object is processed, such as via additive manufacturing. As shown, the steps 104 and 106 may be carried out together, or may be considered as a single step, such that while the object is being processed the various portions of the object are encoded. In this manner, during the processing of the object, the magnetic characteristics of at least a portion of the object may be modified at different spatial locations of the object to form a spatial array of different magnetic characteristics in the object that represents the encoded information.

The object being processed may be defined by a plurality of spatial units, and at least some of the spatial units may correspond to the different spatial locations of the object having different magnetic characteristics that are modifiable for representing the encoded information. In exemplary embodiments, the plurality of spatial units are volume units (voxels) that together define the object in three-dimensions, and the different voxels at the different spatial locations may have different magnetic characteristics to represent the encoded information. Each voxel may be made of a unit of material (homogeneous or heterogenous), which may be amorphous or have a crystalline or semi-crystalline structure, in which one or more microstructural grains may be included in the voxel.

The microstructural grains of the material refer to respective zones that are each a collection of atoms or molecules acting as a crystallite, which may be nano, micro, or macro scale objects. A crystallite is a small or even microscopic crystal which forms, for example, during the cooling of many materials. In this manner, each grain is its own crystal with a uniquely organized lattice structure. Each grain, however, will typically be randomly oriented relative to the whole of the material. As stated previously, within a normal grain there will be several magnetic domains, yet in practical terms there will not be multiple grains within a domain. The local average of the magnetic moments of several domains will make up the measured magnetic field within the voxel, whereas there is no presupposed relation between grains and voxels.

Each voxel may be spherical, polygonal or irregular in shape, and different voxels may have the same or different shape. It is understood that the voxels do not necessarily need to be connected (e.g., bonded, etc.) to each other, or be next to each other in the object, but rather the object may contain interstices, spaces, or buffers between the voxels. It is also understood that the object may be defined by one-dimensional units, or two-dimensional units such as pixels, which also may be modified for carrying out the exemplary method described herein, which may provide for less complex magnetic signatures, as would be understood by those having ordinary skill in the art.

Figure 8:
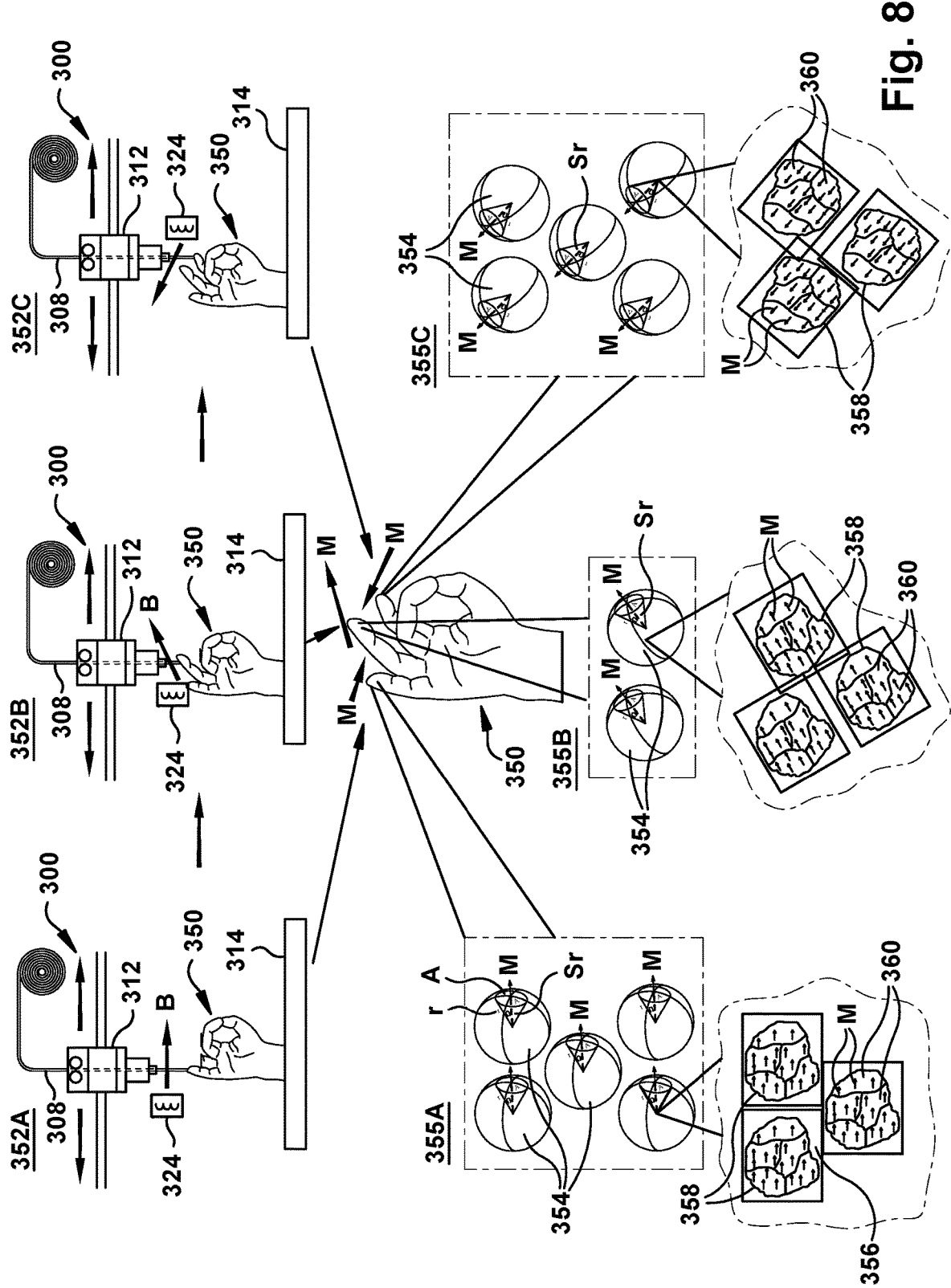
FIG. 8 illustrates various states of additively manufacturing and encoding a physical object according to the present disclosure.

In exemplary embodiments, each voxel includes at least one magnetic domain capable of being modified by exposure to a magnetic field (as shown in FIG. 8, for example, which is discussed in further detail below). For example, when the object is formed from a non-metallic base material, the at least one magnetic domain may be formed as part of a metallic grain that forms at least a portion of a metallic particle contained in the non-metallic base material. As used herein, such a particle refers to a discrete unit of material of indeterminate shape or size, which may include, for example, a powder, filing, fiber, or the like. Alternatively, when the object is formed from a metallic base material, the at least one magnetic domain may be formed by one or more metallic grains that form at least a portion of the metallic base material.

Each voxel may have a single magnetic domain and/or a single metallic grain or single particle. Alternatively, each voxel may have a plurality of magnetic domains and/or a plurality of metallic grains and/or plurality of metallic particles. In exemplary embodiments, all or most of the magnetic domains may be oriented in a particular direction for the voxel to exhibit the particular magnetic characteristic being modified. Generally, the voxel may be considered the smallest container for information which may hold one or more scaler values depending on the characteristics being measured. Within each voxel, the magnetic field stored within the magnetic domain will be related to the magnetic material density (and strength of the applied magnetic field) aligned to a certain direction.

In exemplary embodiments, the particle may initially be unmagnetized in the base material prior to encoding, which allows the particle to be induced with, and retain, permanent magnetic characteristics (e.g., magnetic vector orientation and/or intensity) according to the encoding. It is understood that such "permanent magnetism" or "permanent magnetic characteristics" as used herein means that the magnetic characteristics of the voxel(s) and/or overall material are intended to remain unchanged indefinitely (e.g., readable throughout the useful life of the object), it being understood that such permanent magnetism can be reconfigured or changed in response to a magnetic field or by heating above the Curie temperature, for example. Alternatively, in other exemplary embodiments, the particle may have a current magnetization (e.g., magnetic vector orientation and/or intensity) prior to encoding, and the encoding process may be utilized to reconfigure or reorient the magnetic characteristic of the particle according to the encoding. As discussed above, such considerations of inducing and retaining permanent magnetism (or reconfiguring permanent magnetism) include the material properties (e.g., susceptibility, etc.), the temperature of the material during encoding, other factors as defined by Eq. 1 and Eq. 2 above, or other such considerations.

In exemplary embodiments, the metallic particle containing the magnetic domains is a ferromagnetic or ferrimagnetic material. For example, the voxel and/or metallic particle may include one or more known ferromagnetic or ferrimagnetic materials (magnetized or unmagnetized), such as iron, nickel, cobalt, manganese, aluminum, rare earth metals, and their respective alloys, including their respective oxides, carbides, nitrides, sulfides and the like. It is furthermore understood that such materials that may be utilized as metallic particles in the non-metallic base material also may be utilized as the base material when the objects is made of a metallic material.

By way of non-limiting examples, exemplary ferromagnetic materials may include one or more of the following (with Curie temperature, in K, in parenthesis): Co (1388), Fe (1043), MnBi (630), Ni (627), MnSb (587), $CrO_2$ (386), MnAs (318), Gd (292), Tb (219), Dy (88), EuO (69), or other similar ferromagnetic materials.

By way of non-limiting examples, exemplary ferrimagnetic materials may include one or more of the following (with Curie temperature, in K, in parenthesis): $Fe_2O_3$ (948), $\gamma Fe_2O_3$ (875), $Fe_3O_4$ (850), $FeOFe_2O_3$ (858), $NiOFe_2O_3$ (858), $CuOFe_2O_3$ (728), $MgOFe_2O_3$ (713), $MnOFe_2O_3$ (573), $Y_3Fe_5O_{12}$ (560), $Fe_3S_4$ (610), $Fe_7S_8$ (595), $\gamma FeOOH$ (455).

By way of non-limiting examples, other types of materials also may be included, such as anti-ferromagnetic materials, including for example (with Neel temperature, in K, in parenthesis): $\alpha Fe_2O_3$ (948), FeS (580), $\alpha FeOOH$ (395), $Fe_2TiO_2$ (120), $FeTiO_2$ (40).

In exemplary embodiments, the magnetic characteristic that is modified during the encoding is the magnetic vector orientation of the magnetic domain(s). In this manner, each voxel is capable of exhibiting a magnetic vector in many different orientations, and more particularly may be capable of being configured at many possible orientations with a $4\pi$ steradian ($4\pi$sr) solid angle. The steradian is commonly defined as a dimensionless unit of a solid angle that is the ratio between the area subtended and the square of its distance from the vertex. For example, with exemplary reference to FIG. 8, the illustrated voxels 354 each are represented as a sphere having a radius r and area A, and the highlight area on the surface of the sphere is $r^2$. Thus, the solid angle is equal to $[A/r^2]$sr which is 1 steradian (sr) in this example. As such, the entire sphere has a solid angle of $4\pi$ sr.

Accordingly, in exemplary embodiments, based upon information about the spatial location of the voxel in the object represented in three dimensions (x,y,z) in combination with the magnetic vector orientation of the voxel (e.g., $4\pi$ options), each voxel may be capable of exhibiting at least 1-bit of information, more preferably 2 or more bits of information, even more preferably 4 or more bits, such as at least 8-bits of information. More particularly, because the magnetic vector of each voxel may be configurable at many possible orientations with a $4\pi$ steradian solid angle, a wide range of bits may be possible for each voxel or combination of voxels (for example, 2, 4, 6, 8, 10, 12, 14, 16-bits or more), which may depend on the resolution and/or quality of the material, the resolution of the encoder, the capabilities of the decoder, among other considerations. By providing each voxel with an enhanced amount of information in this way allows the magnetic signature and/or encoding of the information to be performed at a high-level, which may provide a significant advantage over typical binary encoding, such as 1-dimensional (e.g., barcode-like) or 2-dimensional (e.g., QR code-like) encoded information. Moreover, as discussed in further detail below, the magnetic characteristic that is modified during the encoding also may include the magnetic vector intensity of the magnetic domain(s), which may further enhance the amount of encoded information.

It is understood that although the voxels may be spherical (as shown in FIG. 8, for example), one or more voxels may have different sizes and/or shapes, such as polygonal or irregular shapes. In this case, the $4\pi$ steradian solid angle would be the steradian of the sphere encompassed by the voxel shape. It is also understood that although a particular group of voxels in a particular region of the object may have the same orientation as shown in FIG. 8, adjacent voxels may have different orientations, which could provide for an even higher fidelity of encoded information. Furthermore, it is understood that although the orientation of the magnetic field may be the preferred magnetic characteristic that is modified (such as via orientation of the magnetic domain(s) within the voxel), other magnetic characteristics also may be modified, such as the magnetic strength of the voxel, which may be adjusted based upon the magnetic vector intensity of the magnetic domain(s) or the density and/or number of magnetic domains (or particles) oriented in a particular orientation, for example.

In exemplary embodiments, the processing/encoding includes exposing the voxels defining at least a portion of the object to a reconfigurable external magnetic field, whereby the magnetic field configures the magnetic domains of the voxels in the same magnetic direction as the external magnetic field and/or with an intensity that is proportional to the external magnetic field. In this manner, as the direction and/or intensity of the external magnetic field changes at different spatial locations of the object, the voxels and/or magnetic domains at those different spatial locations will have different magnetic characteristics to form a spatial array of the different magnetic characteristics that represents the encoded information.

More particularly, in exemplary embodiments, the encoding is performed during additive manufacturing of the object, in which the encoding includes exposing at least some of the voxels at the different spatial locations of the object to an external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field. During the encoding, the magnetic vector direction and/or magnetic vector intensity of the external magnetic field may be varied at the different spatial locations of the object to form a spatial array of different magnetic characteristics (e.g., magnetic vector orientation and/or intensity) in the object that represents the encoded information.

In exemplary embodiments, each voxel of the material exposed to the external magnetic field may contain at least one magnetizable particle having one or more of the magnetic domains that can be induced with permanent magnetism via exposure to the external magnetic field. In exemplary embodiments, the external magnetic field may be configured with an intensity that induces this permanent magnetism into the magnetic domain(s) of the respectively exposed particles without causing movement of each respective particle relative to its surrounding base material. Such a configuration may permit the magnetic encoding of the object while minimizing distortion of the object which otherwise could occur if the particles were caused to move through the surrounding matrix material during processing.

As discussed in further detail below, once the magnetic domain(s) are configured via magnetic orientation and/or intensity, then the magnetic properties (e.g., ferromagnetic) of the metallic particle(s) containing the domain(s) may cause the magnetic configuration of the domain(s) to remain static or fixed at the location to immutably embed the information in the object. This external magnetic field may be generated by a magnetic field generator, such as a strong magnet or electromagnetic coil. The magnetic field generator (optionally in combination with a controller or processor) may be considered the encoder of the exemplary system that encodes the information in the object. For example, the encoder may receive information from the storage device containing the information for output to the object during processing, and may cooperate with the controller during the processing to determine where, how and when to encode information on the object. Generally, if no external field is applied during processing, then the result is a net neutral magnetic configuration of the voxel(s) (e.g., magnetic but no specific field alignment).

As discussed above, typical permanent magnetic materials, such as ferromagnetic materials, divide into magnetic domains which are regions of the material having individual dipoles in which electrons have aligned due to their magnetic fields and thus can be altered by an external magnetic field. In this manner, if a strong enough external magnetic field is applied to the material the domain walls will move by the process of the spins of the electrons in atoms near the wall in one domain turning under the influence of the external field to face in the same direction as the electrons in the other domain, thus reorienting the domains so more of the dipoles are aligned with the external field.

For the exemplary ferromagnetic or ferrimagnetic materials, the domains will remain aligned when the external field is removed to create a permanent magnet having a static orientation of the magnetic domains in that region or in that voxel of the object being processed.

As mentioned above, the exemplary method 100 may utilize various materials and various processing techniques for encoding the information in the object.

For example, the object may at least partially be made of a material with a metallic base (e.g., greater than 50% metal, for example). The metallic base material may be a ferromagnetic or ferrimagnetic material, such as iron, nickel, cobalt, manganese, aluminum, rare earth metals, and/or their respective alloys, or any other suitable material, such as those mentioned above. In this manner, the magnetic domains in the metallic-base material may be part of the metallic grains that form the metallic material.

Accordingly, in exemplary embodiments where the object is made of a material with a metallic base material, the processing/encoding includes modifying the magnetic characteristics by heating at least a portion of the material above a particular temperature and exposing the magnetic domains in that region to an external magnetic field to configure the magnetic domains of the material in that region (and/or voxels containing metallic grains of the material) in the same magnetic direction as the external magnetic field and/or with an intensity that is proportional to the external magnetic field being applied. Thereafter, upon cooling that portion of the material below the particular temperature, the magnetic domains remain permanently configured in the direction and/or intensity of the external magnetic field in such a way that a permanent magnetic signature is created by the array of different magnetic orientations and/or intensities at the different spatial locations of the object.

In some exemplary embodiments, the particular temperature to which the metallic base material is heated is at or above the Curie temperature of the material. In such an embodiment, the permanent magnetic characteristics of the material will be erased above the Curie temperature, whereupon cooling below the Curie temperature while concurrently being exposed to the external magnetic field will permanently fix, or "freeze," the magnetic characteristics of the magnetic domains of the material according to the external magnetic field applied. In some other exemplary embodiments, the particular temperature to which the metallic base material is heated is below the Curie temperature of the material, wherein the external magnetic field is configured with an intensity that induces (or reconfigures) magnetism in the magnetic domains based upon the external magnetic field applied. In some embodiments, the particular temperature to which the metallic base material is heated may be below, at or above the melting temperature (Tm) of the material (in which the metallic material is in a flowable state) to facilitate encoding during processing, such as during additive manufacturing. Such considerations of the nominal processing temperature for encoding the metallic base material are shown with exemplary reference to FIG. 15A and FIG. 15B, as discussed in further detail below.

By way of non-limiting examples, the process(es) by which such metallic-based materials can be encoded include one or more of: (1) additive manufacturing techniques, including: material jetting, powder bed fusion (e.g., direct metal laser sintering, electron beam melting, selective laser melting or selective laser sintering), laminated-based techniques (e.g., laminated object manufacturing), direct energy deposition (e.g., laser engineered net shaping, direct metal deposition), etc.; and (2) traditional techniques, including melting, casting, molding, rolling, extruding, drawing, forging, sintering, welding, heat treating, such as annealing tempering, etc. It is understood that the foregoing process (es)/encoding may be performed during the formation of a new object or during the modification of an existing object. It is furthermore understood that the encoding of the magnetic domains may include inducing permanent magnetization into such domains that were not previously magnetic, or may include reconfiguring the magnetic orientation of such domains that were previously permanently magnetic.

In exemplary embodiments, the object may be made of a material with a non-metallic base (e.g., greater than 50% non-metal) having magnetic domains embedded therein for encoding. The non-metallic base material may be a polymer, ceramic, composite or the like. For example, one or more of an acid-, base- or water-soluble polymer, such as acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), epoxy, phenolic, or other such polymers.

The magnetic domains in the non-metallic base material may be formed by magnetizable particles included in the non-metallic base, such as by being dispersed or otherwise embedded within the matrix of the non-metallic base. In exemplary embodiments, the magnetizable particles include metallic particles dispersed within the non-metallic matrix. In this manner, the magnetic domain(s) may be formed as part of the metallic grain(s) that form at least a portion of the metallic particle(s), such as powders, filings, fibers, or the like. Alternatively or additionally, the metallic particles may be contained within sheets of the non-metallic material, or may be contained in sheets that are interleafed/interspersed with the non-metallic material, such as for processing via lamination-based techniques.

In exemplary embodiments, where the object is made of a material with a non-metallic base having flowable properties, the processing/encoding may include modifying the magnetic characteristics by heating at least a portion of the material above a particular temperature and then exposing magnetic domains (e.g., metallic particles) in that region of the material to an external magnetic field to thereby configure the magnetic domains in that region (and/or voxels containing the metallic particles) in the same magnetic direction as the external magnetic field and/or with an intensity that is proportional to the external magnetic field being applied. Thereafter, upon cooling that portion of the material below the particular temperature, the magnetic domains remain permanently configured in the direction and/or intensity of the external magnetic field in such a way that a permanent magnetic signature is created by the array of different magnetic orientations and/or intensities at the different spatial locations of the object. It is understood that the encoding of the magnetic domains may include inducing permanent magnetization into such domains that were not previously magnetic, or may include reconfiguring the magnetic orientation of such domains that were previously permanently magnetic.

In some exemplary embodiments, the particular temperature to which the non-metallic base material is heated is at or above the glass transition temperature (Tg) of the material to provide the material in a flowable state. In such an embodiment, the external magnetic field is configured with an intensity that induces (or reconfigures) magnetism in the magnetic domains based upon the external magnetic field applied, and preferably without causing movement of the particles relative to the non-metallic matrix while the matrix is still in the flowable state. In some other embodiments, the particular temperature to which the metallic base material is heated may be below the glass transition temperature (Tg) of the material (in which the material is in a non-flowable state), and the external magnetic field is configured to induce (or reconfigure) magnetism in the magnetic domains as described above. Such considerations of the nominal processing temperature for encoding the non-metallic base material are shown with exemplary reference to FIG. 15A and FIG. 15B, as discussed in further detail below.

By way of non-limiting examples, the process(es) by which such non-metallic-based materials can be encoded include one or more of: (1) additive manufacturing techniques, including: material extrusion and deposition (e.g., fused-deposition modelling or fused-filament fabrication), vat polymerization, material jetting, binder jetting, powder bed fusion (e.g., selective laser melting or selective laser sintering), laminated-based techniques (e.g., laminated object manufacturing), direct energy deposition, etc.; or (2) traditional techniques, such as extrusion, green-shaping/sintering, or molding, including: thermoforming, compression and transfer molding, rotational molding and sintering, single or twin extrusion, die extrusion, injection molding, blow molding, etc. It is understood that the foregoing process(es)/encoding may be performed during the formation of a new object or during the modification of an existing object. Alternatively or additionally, the non-metallic material may be encoded in the same or similar manner as the method for the metallic material described above, in which case the non-metallic material could be heated above the Curie temperature of the metal particles in the non-metal matrix.

There are various factors that may affect the resolution or fidelity of the information encoded in the object. For example, the resolution of the encoded information in the object may be based upon one or more of: magnetic domain size, number of magnetic domains in a voxel, voxel size (e.g., size of the deposition), number of voxels in a region, grain size and/or number of grains within a particle, particle size, number of metallic particles within a voxel, number of orientations of the magnetic characteristic in the particle and/or voxel, number of dimensions of the object, external magnetic field size and/or strength, etc.

Still referring to FIG. 1, prior to the step of decoding the information in the object (step 108), the encoded object is delivered to an end-user or intermediate user, such as a customer (step 116). In addition, the data concerning the encoding of the object is transmitted to the end-user or intermediate user (step 118) to enable that user to compare the decoded information from the object to the originally encoded information to verify authenticity, for example.

At step 108, the information encoded in the object may be decoded by a decoder (optionally in combination with a controller or processor). For example, the magnetic signature in the object may be decoded by an exemplary magnetometer that is capable of reading and mapping the orientation and location (in one, two or three dimensions) of the various voxels having different magnetic characteristics for decoding the information. For example, as shown in the illustrated embodiment, at step 120 the magnetic field vectors $(\Theta,\Phi,\rho)$ are measured with the magnetometer at locations $(x,y,z)$ of the object. As mentioned above, the voxel may be considered the smallest container for information which may hold one or more scalar values depending on the characteristics being measured. It is noted that a voxel of the object (e.g., formed via additive manufacturing or other processing) may be different in size and/or shape from the voxel of the reading device. Because a voxel is read at a particular x,y,z location by the decoder, the voxel value may be considered the net effect of local fields at that spatial coordinate.

After the information has been read, mapped, and decoded, the decoder may output the decoded information to a subsequent electronics unit, such as a computer, or may output the information for display to a user. As shown at step 122, the decoded data from the object may then be compared to the originally encoded data (as sent from the vendor, for example). Thereafter, the object may be accepted if the decoded information sufficiently matches the encoded information (step 124), may be rejected if there is no information encoded on the object (step 126), or may be identified as having been tampered with if there is not a sufficient match between the decoded information and the encoded information (step 128).

Referring to FIG. 2, an exemplary system 200 for encoding information in an object via an exemplary additive manufacturing process is shown. In the illustrated embodiment, the additive manufacturing and encoding system 200 includes a fused deposition modelling apparatus 206 in which one or more of feed materials 208 are supplied via input port(s) 210 to an extrusion head 212 (also referred to as an extruder), which may be moveable in x,y,z coordinates relative to a build substrate 214 (e.g., build platform). The feed rate of the feed material(s) 208 may be independently controlled by the one or more actuators 216 for being supplied to the extrusion head 212 and out of an exit nozzle 218 of the extrusion head. The one or more actuators 216 may include motors, such as stepper motors, which may be selected in a suitable manner well-known in the art. The actuator(s) 216 may be independently controlled to convey the material(s) from a spool 220 or other supply through the input passage(s) 210 and downstream toward the exit nozzle 218 with prescribed feed forces or feed rates that may be selected or adjusted depending on the system requirements.

The feed material(s) 208 may be provided in solidified form (e.g., thermoplastic filaments) and may be thermally liquefiable into a flowable or fluid state. In the illustrated embodiment, the system includes one or more heating elements 222 configured to heat and/or liquefy one or more of the feed materials 208. As used herein, the term "liquefied" or "liquefication" includes heating to a temperature, or maintaining at a temperature, above the melting point (or glass transition temperature) of the material being heated for effecting a flowable or fluid state of the material.

Upon exiting the nozzle 218, the feed materials are deposited in a layerwise fashion on the substrate 214 and are cooled to a non-flowable state. The material is then built up in this fashion, layer-by-layer, to form a three-dimensional object. Generally, the additive manufacturing apparatus 206 also may include a frame operatively coupled to the build platform, a vertical motion (Z) drive system, a lateral motion (Y) drive system, and an orthogonal lateral motion (X) drive system. The build platform 214 may be movable relative to the frame via the Z drive and Y drive, and the extruder 212 may be movable relative to frame via the X drive. Many other configurations are possible, as understood by those having ordinary skill in the art.

In the illustrated embodiment, the filament is a thermoplastic material that includes magnetic domains in the form of metallic particles, such as iron powder, filings or fibers contained in the thermoplastic material. One or more of the metallic particles are included in voxels (units of volume of the material), in which the magnetic domains of the voxels are orientateable in many different directions (e.g., $4\pi$ sr) when exposed to an external magnetic field that is orientateable in the many different direction.

In exemplary embodiments, the external magnetic field is generated by a magnetic field generator 224, such as a strong magnet or electromagnetic coil (shown in the illustrated embodiment). The magnetic field generator 224 (optionally in combination with a controller or processor) may be considered the encoder of the exemplary system that encodes the information in the object. In exemplary embodiments, the magnetic field generator 224 may be a multi-axis magnetic field generator to provide the magnetic field in the many different directions (e.g., $4\pi$ sr). One or more actuators 228 may be operatively coupled to the magnetic field generator 224 to enable such multi-axis functionality. In addition, the electromagnetic coils may be contained within a chamber or cup 230 made of a material, such as mu metal, configured to contain the magnetic field (shown with vector lines B directed perpendicular to the build platform).

As shown in the illustrated embodiment, the system also includes a controller 226 that is operatively coupled to one or more other parts of the system, including the actuators 216, the heating elements 222, the magnetic field generator(s) 224, and/or the actuator(s) of the magnetic field generators 228. The controller 226 may receive instructions according to a model of the three-dimensional article to be formed, and may also receive feedback from sensors or other devices for verifying and adjusting the control of such parameters. For example, the controller 226 is operatively coupled to the actuators 216 for independently controlling the feed rate or feed force of each of the feed materials 208 through the extruder 212. The controller 226 also is operatively coupled to the one or more heating elements 222 for independently controlling the temperature of the feed material 208, such as for achieving a desired viscosity of the material. The controller 226 also is operatively coupled to the magnetic field generator 224 (such as via actuator 228) for controlling the direction and/or intensity of the magnetic field (B). In this manner, the encoder may receive information from the storage device containing the information for output to the object during processing, and may cooperate with the controller during the processing to determine where, how and when to encode information on the object. It is understood that other parameters other than those described above also may be controlled by the controller 226, as would be understood by those having ordinary skill in the art Turning now to FIG. 8, various states of additively manufacturing and encoding a physical object 350 are shown at 352A, 352B, and 352C, which represent different time intervals at which different portions of the object 350 (e.g. finger 1, finger 2 and finger 3, respectively) are formed. In the illustrated embodiment, the additive manufacturing process is a fused filament fabrication process which utilizes an additive manufacturing and encoding system 300, which may be the same as the system 200 in FIG. 2. Consequently, the same reference numerals but in the 300-series are used to denote structures corresponding to the same or similar structures between the systems 200 and 300. As such, the foregoing description of the system 200 is equally applicable to the system 300 except as noted below.

As shown at reference numerals 352A-352C, a magnetic field generator 324 generates a magnetic field (B) with a magnetic vector direction and magnetic vector intensity. The magnetic field generator 324 may be a multi-axis system configured to direct the external magnetic field in many different directions, including translation in the x,y,z direction and rotation at directions ($\rho$, $\theta$, $\phi$) therebetween. As such, the magnet field generator 324 is capable of encoding the material via exposure to the magnetic field B in these various directions while voxels 354 of the material are being extruded and/or deposited at the different spatial locations (e.g., 355A, 355B, 355C) of the object 350.

In exemplary embodiments, the feed material 308 is a non-metallic base material (e.g., thermoplastic) having metallic particles 358 (e.g., iron (ferromagnetic) particles) dispersed within the non-metallic matrix 356. In the illustrated embodiment, during the additive manufacturing process, the material 308 is heated above its glass transition temperature within the extruder 312 to enable extrusion through the exit nozzle. While the material is flowable, for example, the magnetic field generator 324 generates the magnetic field B in a particular direction and/or with a particular intensity to expose voxels 354 of the base material containing the metallic particles 358 to the external magnetic field B.

The impingement of the magnetic field B on the voxels 354 in the respective regions (e.g., 355A, 355B, 355C) of material causes the voxels 354 in the exposed regions to form a permanent magnetic field (M) with a magnetic vector orientation in the direction of the applied magnetic field and/or with a magnetic vector intensity proportional to the applied magnetic field. For example, in the illustrated embodiment, the regions of voxels 354 at specific spatial locations (e.g., 355A-C) of the object are shown in which the voxels in the respective regions have magnetic orientations M that correspond to the direction of the magnetic field B applied during the formation of that particular portion of the object. Thereafter, upon being deposited and cooling below the glass transition temperature, for example, the magnetic field M of the voxels 354 at the respective spatial locations (e.g., 355A-C) remain permanently oriented in the direction of the magnetic field applied at those regions. As shown, varying the external magnetic field B at the different spatial locations (e.g., 355A-C) of the object forms a spatial array of different magnetic characteristics (e.g., different magnetic vector orientation and/or intensity) in the object 350 that represents the encoded information.

More particularly, as shown in the illustrated embodiment, each of the respective voxels 354 has at least one magnetic domain 360 that is inducible (or reconfigurable) with permanent magnetism via exposure to the external magnetic field. As shown, the magnetic domains 360 may be formed as part of each metallic particle 358 disposed within the non-metallic matrix 356. As discussed above, each magnetic domain 360 may have magnet dipole moments (m) that can be aligned by exposure to the external magnetic field to cause the magnetic domain (or collective domains) to exhibit permanent magnetism. In other words, the magnetic field B induces permanent magnetism into the magnetic domains 360 of the respectively exposed voxels 354 (e.g., those domains formed by metallic particles 358 in the exposed voxels) such that the magnetic moments (m) of the domains 360 align in response to the applied magnetic field. As such, the magnetic domains 360 configure and retain a magnetic vector orientation in the same magnetic direction as the external magnetic field and/or with magnetic vector intensity that is proportional to the intensity of the external magnetic field that was applied. For example, in the illustrated embodiment, the magnetic domains 360 in the respective metallic particles 358 at the different locations (e.g., 355A-C) of the object have magnetic orientations that have been modified to correspond to the direction of the magnetic field applied during the formation of the particular portion of the object. The collective magnetic orientations of these domains (and/or collective magnetic orientation of multiple metallic particles) therefore determine the magnetic vector orientation of the voxel (or collection of voxels) to exhibit the permanent magnetic field at the particular location of the object.

Furthermore, as noted above, the external magnetic field B may be configured with an intensity that induces (or reconfigures) permanent magnetism in the magnetic domains 360 of the respectively exposed metallic particles 358 without causing movement of the metallic particles 358 relative to the surrounding non-metallic base material 356. As discussed above, such a configuration may permit the magnetic encoding of the object 350 while minimizing distortion of the object which otherwise could occur if the metallic particles 358 were caused to move through the non-metallic material matrix 356 during processing. Such a configuration also may reduce the occurrence of microfractures, bubbles, or more general superficial distortion of the desired part shape.

As discussed above, because each voxel 354 may be capable of exhibiting many different possible magnetic orientations, and more particularly may be capable of being configured at many possible orientations with a 4π steradian solid angle, each voxel is capable of exhibiting a wide range of bits of information (such as at least 1, 2, 4, 6, 8, 12, 14, 16 or more bits of information) based upon its magnetic vector orientation (e.g. 4π options) and/or magnetic vector intensity, in combination with the spatial location of the voxel in the object represented in three dimensions (x,y,z). This allows for a highly complex magnetic signature and/or encoding of the information.

It is understood that although the illustrated embodiment shows the entire area of the exit nozzle of the extruder 312 being within the magnetic field B, that alternative methods are possible. For example, the extrusion head 312 may have a magnetic field generator for modifying the magnetic characteristics of the build material at a much finer level of resolution. Alternatively or additionally, the entire area of the additive manufacturing apparatus may be within the magnetic field. Alternatively or additionally, the base plate 314 or substrate upon which the build material is deposited may have reconfigurable magnets that allow for the region to induce a change in the magnetic characteristics upon cooling of the material. Moreover, it is understood that although the exemplary illustrations show the magnetic domains 360 of the particles and/or the overall magnetic vector orientation of the respective voxels 354 all pointing in a specific direction, that certain magnetic domains, particles and/or voxels in a region may point in different directions from adjacent domains and/or voxels, so long as the net effect is to provide the desired magnetic orientation at the specified spatial location of the object.

EXAMPLES AND OTHER CONSIDERATIONS

In view of the foregoing discussion, several examples and other considerations for magnetically encoding physical objects according to the present disclosure will be described in further detail below.

Example 1

The experimental setup includes a MakerBot™ fused deposition modeling apparatus having magnets placed in a predetermined plus or minus orientation below the base plate of the AM apparatus. The feed material is an iron filled PLA filament (PLA base material with iron particles dispersed therein). During the process, a coupon of the material (e.g., the object) is additively manufactured using the iron-filled PLA filament under normal processing conditions in which the material is deposited onto the base plate under which the permanent magnets were affixed. Upon cooling, it is found that the additively manufactured bricks permanently retained the magnetic orientation pattern of the magnets on which they were printed. The experiment is rerun several times using magnets of various strength (low strength, medium strength, and high strength) under the base plate. The low strength magnets are "Dadetic" brand 8 mm×3 mm round cylinder magnets sold by Dadeta via Amazon.com (ASIN number B073TLKCXK). The medium strength magnets are 1.26 inch×0.125 inch (32 mm×3 mm) neodymium (NdFeB) grade N52 disk magnets with 18 lbs. (8.2 kg) of advertised pull force, sold by Applied Magnets via Amazon.com (ASIN number B01MSTKTSF). The high strength magnets are 1.26 inch×0.31 inch (32 mm×8 mm) neodymium (NdFeB) grade N42 countersunk permanent magnets with 90 lbs. (40.8 kg) of advertised pull force, sold by Applied Magnets via Amazon.com (ASIN number B01MFCWIU6).

Figure 9A:
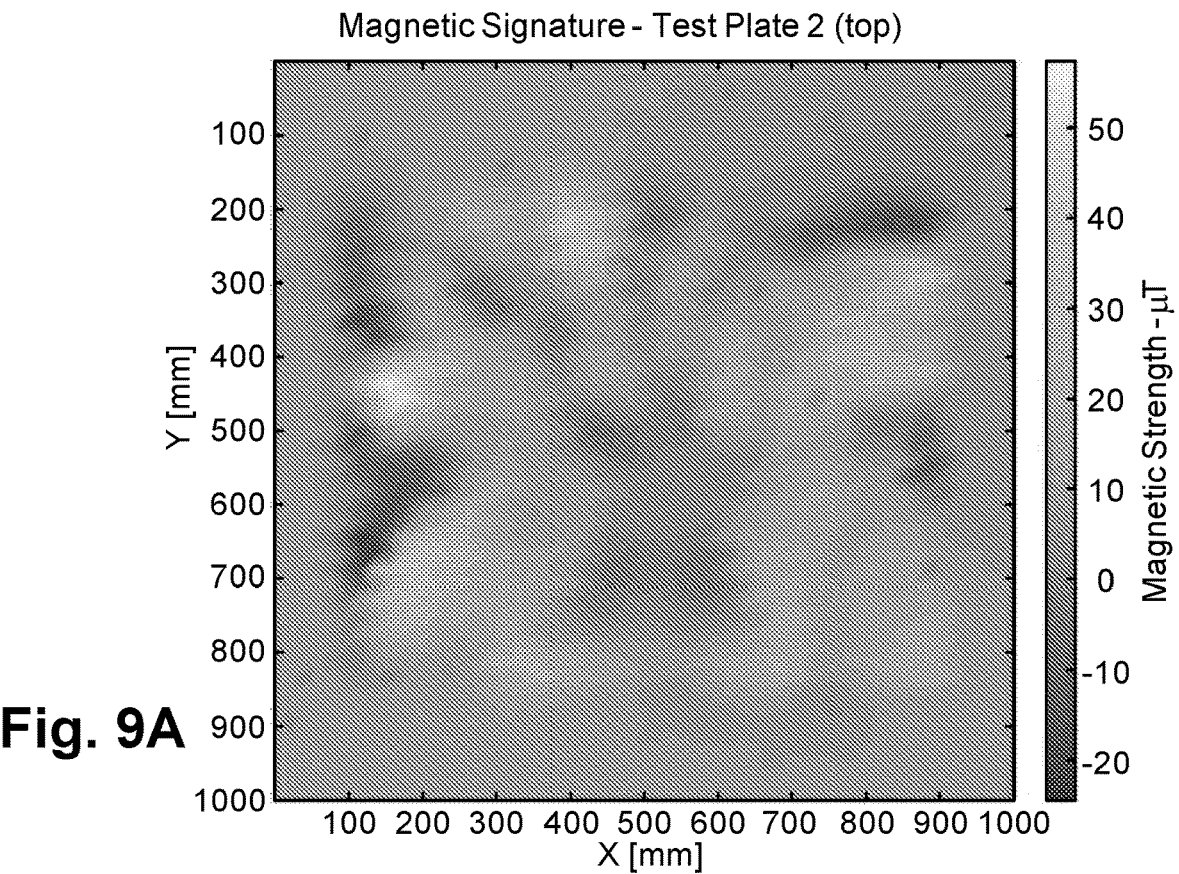
FIG. 9A shows a post-processed image of magnetic signatures from a top surface of a test coupon from experimental testing according to the present disclosure.
Figure 9B:
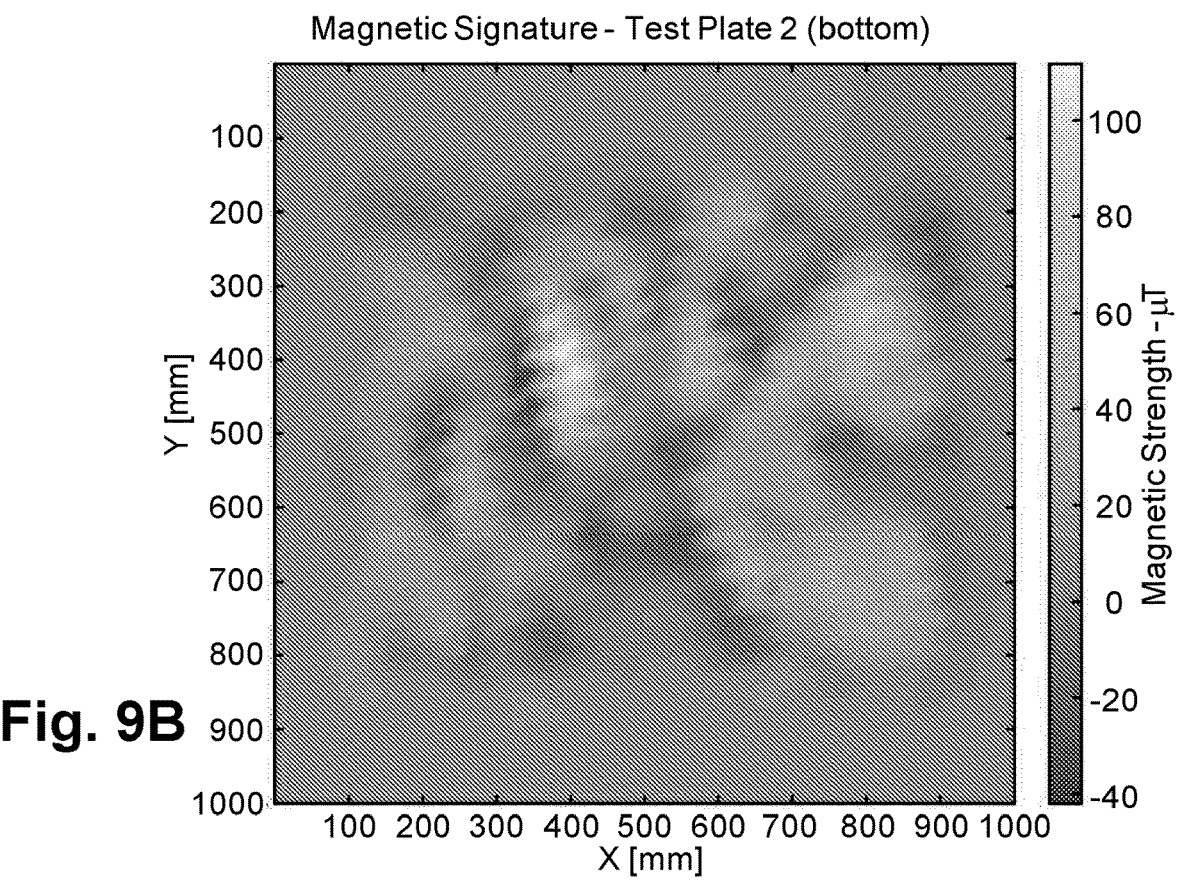
FIG. 9B shows a post-processed image of magnetic signatures from a bottom surface thereof.
Figure 10A:
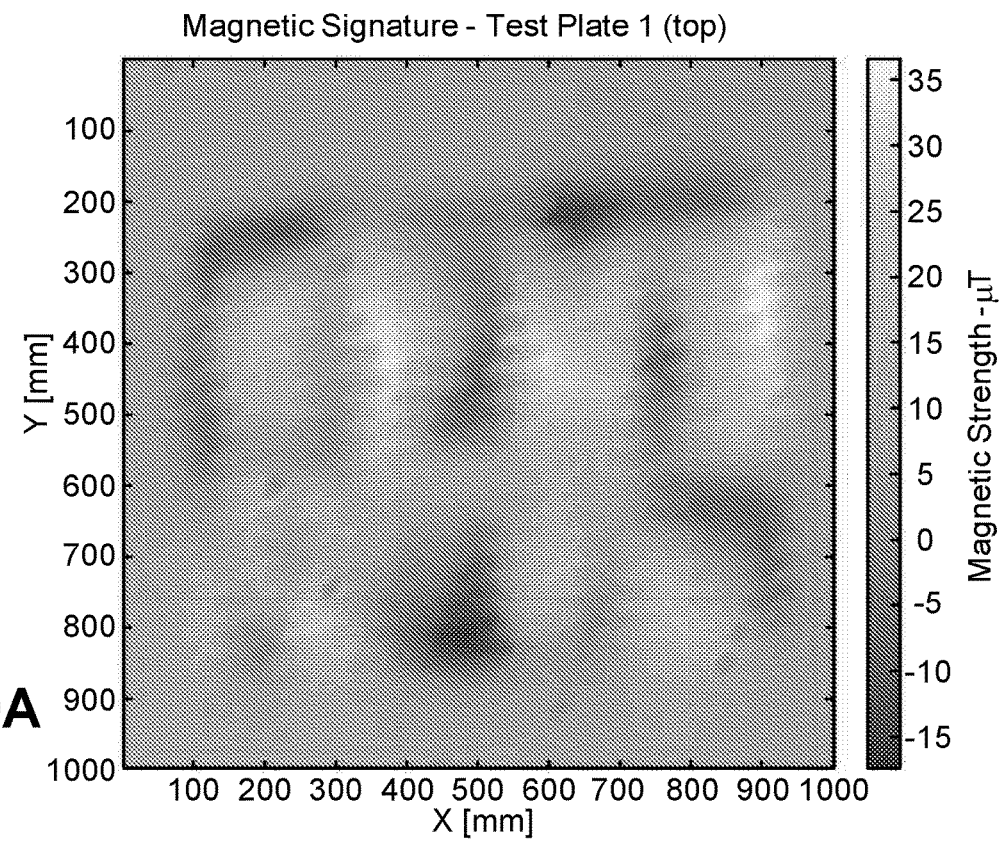
FIG. 10A shows a post-processed image of magnetic signatures from a top surface of a test coupon from additional experimental testing according to the present disclosure.
Figure 10B:
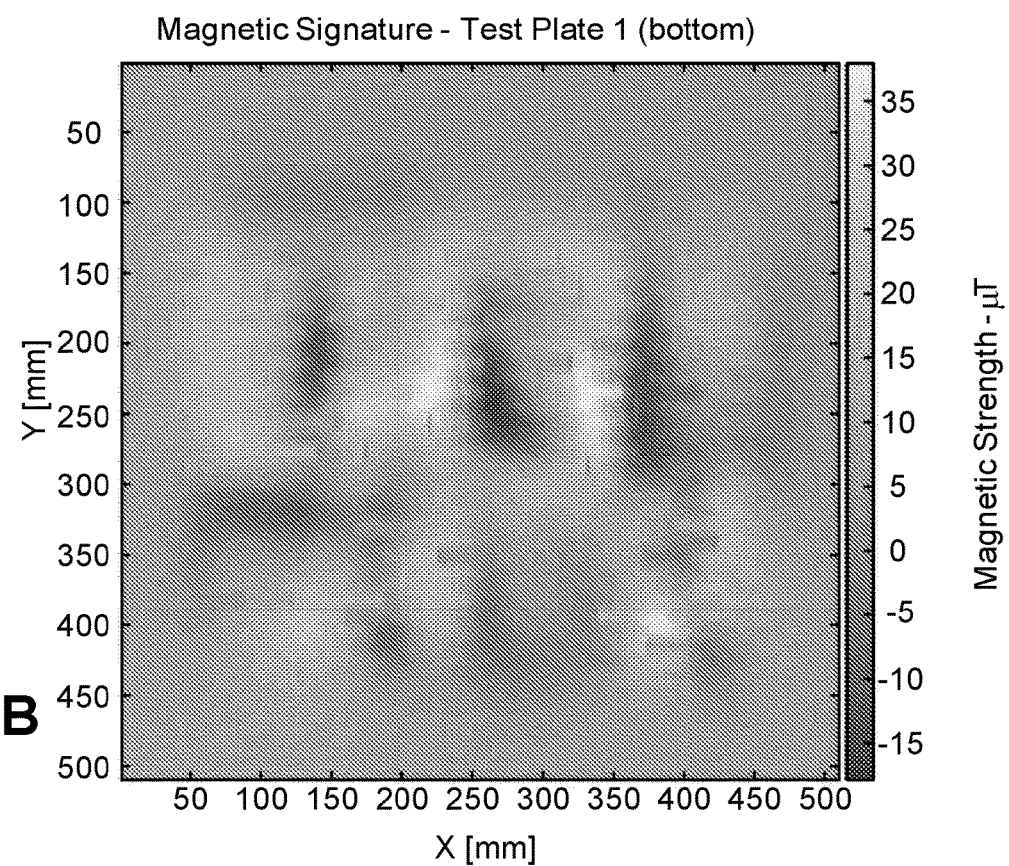
FIG. 10B shows a post-processed image of magnetic signatures from a bottom surface thereof.

A scanner (decoder) is used to detect the magnetic signature of the coupons. The scanner is an x-y plotter with an attached COTS magnetometer. During scanning, the magnetometer is held near the surface of the coupon by utilizing a mount, and the scanner scans back and forth across the object, recording its own coordinates and the magnetic readout, and then outputs this information to a computer. It is found that the scanner can detect the magnetic field and automatically scans the object, outputting the results in a way that can be easily visualized. The scanner can target specific coordinates on the object, and measure the field, which allows this information to be compared to known values to determine authenticity. FIGS. 9A and 9B show post-processed images of magnetic signatures from the top (FIG. 9A) and bottom FIG. 9B) surfaces of the coupon of this experiment utilizing the low strength magnets. FIGS. 10A and 10B show post processed images of magnetic signatures from the top (FIG. 10A) and bottom (FIG. 10B) surfaces of the coupon of this experiment utilizing the medium strength magnets.

The results of this experiment also demonstrate that low strength magnets appear to provide a magnetic signature that are below the resolution of the read sensor of the magnetometer, however, a different magnetometer device may have yielded different results. The medium strength magnets yield visible results on the scanner, which is believed to be caused by the magnetic domain alignment of the iron filings within the PLA medium being reoriented to the baseplate magnetic fields during printing. The high strength magnets deform the lower surface of the coupon due to substantial movement of the particles into localized regions near the magnets, and it is believed that the magnetic signature may be above the resolution of the read sensor of the magnetometer in some areas, causing it to be difficult to read the full-pattern.

Example 2

An additive manufacturing apparatus utilizes a uniaxial electromagnetic coil that surrounds the nozzle of the extruder. The coil is an electromagnet used to dynamically manipulate the strength of magnetization in one axis, perpendicular to the printing plane.

Control of the electromagnet (strength and polarity) are parameters which can be used as additional axes of control during slicing of the object model. If field magnitude is the only controlled parameter, approximately half the potential useful information is being discarded. Thus, if increasing information density is a key concern, adding polarity control is a simple means of gaining additional information density.

It should be recognized that controlling the fidelity of the writing function (i.e., how tightly current is supplied/ changed to electromagnet during the motion of the AM process) has a significant impact on the total physical size of embedded information. The resolution of embedded information also becomes the driver on the design of the reading device as well as the writing device. Resolution is discussed in more detail below.

2-D (Dynamic) and 3-D Magnetic Fields

In contrast to the 1D case of Example 2, which deals only with field magnitude and polarity perpendicular to the printing plane, the 2D becomes more complicated. For example, without reorienting magnetic field (basis) vectors in the 2D case, the second vector would be oriented across the surface plane. This is typically impractical outside of the 1-D case.

Figure 11:
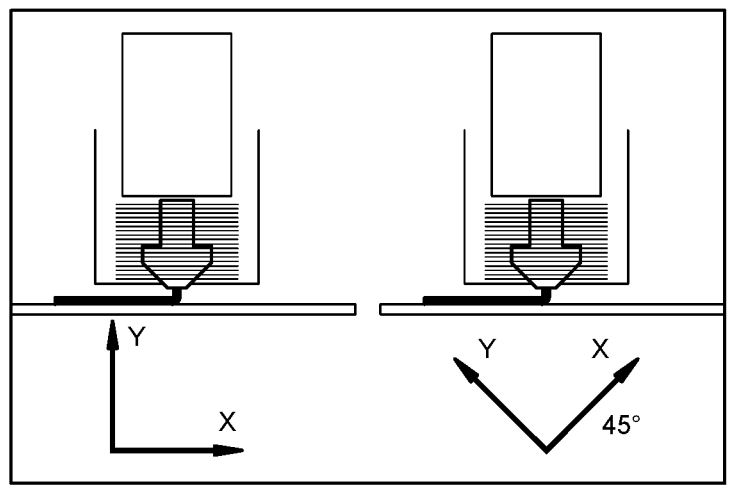
FIG. 11 is an illustration of various orientations and/or magnitudes of an external magnetic field and the equivalent vectors.
Figure 11:
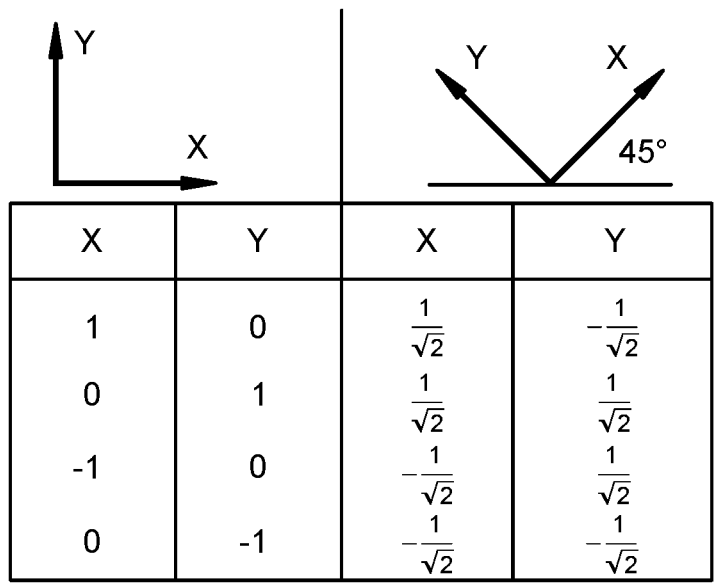
Figure 11:
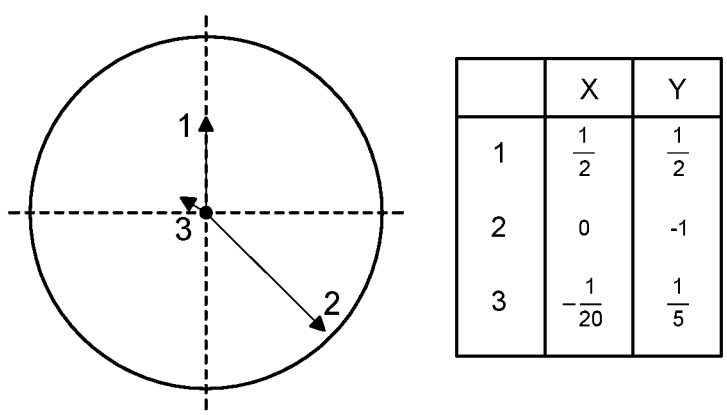

To increase the amount of information which can be stored in a given volume, one can leverage the properties of vectors, as shown in FIG. 11 for example. By making perpendicular basis vectors which are rotated at a 45 degree angle to the plane (FIG. 11, top right) to each other, one can maximize the total possible vector combinations (FIG. 11, middle). In order to create an effective printing environment that maximizes potential information, multiple electromagnets operating at the same time may be required. This drives toward the fabrication of a print head having three orthogonal coils. This allows the creation of a 3D vector contained within the unit sphere (FIG. 11, bottom), enabling $4\pi$ steradians worth of pointing angles. These vectors may then be conveniently utilized in Cartesian (x,y,z), spherical ($\rho,\Theta,\varphi$), or any other equivalent set of coordinates as needed by the design and/or slicing process.

Resolution

Resolution is a common term with slightly different meanings within different disciplines. The intent here is to understand the limitations on physical spacing of information. For example, if one were to create alternating thin black and white lines, the question becomes how closely one could space those lines and discern them as distinctive lines. At some resolution, these lines might only be perceived as a field of gray. The value of resolution where one could still discern thin black and white lines, measured in lines/mm, is called the limiting resolution.

The example described above is typical of spatial resolution, which is common in the field of inkjet and LaserJet printers which print at 200/600/1200/etc. DPI (dots per inch—another common unit of spatial resolution). DPI is limited by the printing device, however, the printer is not the only limiting device. If one is able to obtain information off the printed page, then one also needs to consider the limits in resolution of the reading device. The reading resolution actually defines how good a print needs to be. For printers, the human eye is often the reading device, which easily observes that low DPI prints tend to lack detail and look grainy. Generally, by increasing the number of boxes within the square, the spatial resolution increases. This, however, is limited ultimately by the display/printer resolution. This should highlight a key point, more resolution may be better, but only to a point.

Just as there are limitations on the spatial characteristics (the dots/lines can be packed) the magnitude also has limitations. For a display/printer this would be the number of discrete intensity levels capable of being generated. For an electronic system, this would be limited by the number of steps in an A/D converter. An 8-bit converter would be able to represent 256 discernable levels from 0 to 255 ($2^8$); whereas a 12-bit converter would represent 4096 ($2^{12}$) levels.

Writing Resolution

As mentioned above, the ultimate resolution of an object is dependent partly on the printing device and partly on the reading device. In the case of a 3D printer, writing resolution is dimensionally limited by two primary items: the mechanics of the printer in each of the three Cartesian axes (X, Y, Z), and the slicer software. For now we assume the slicer is capable of resolutions which are much better than the printer.

Figure 12:
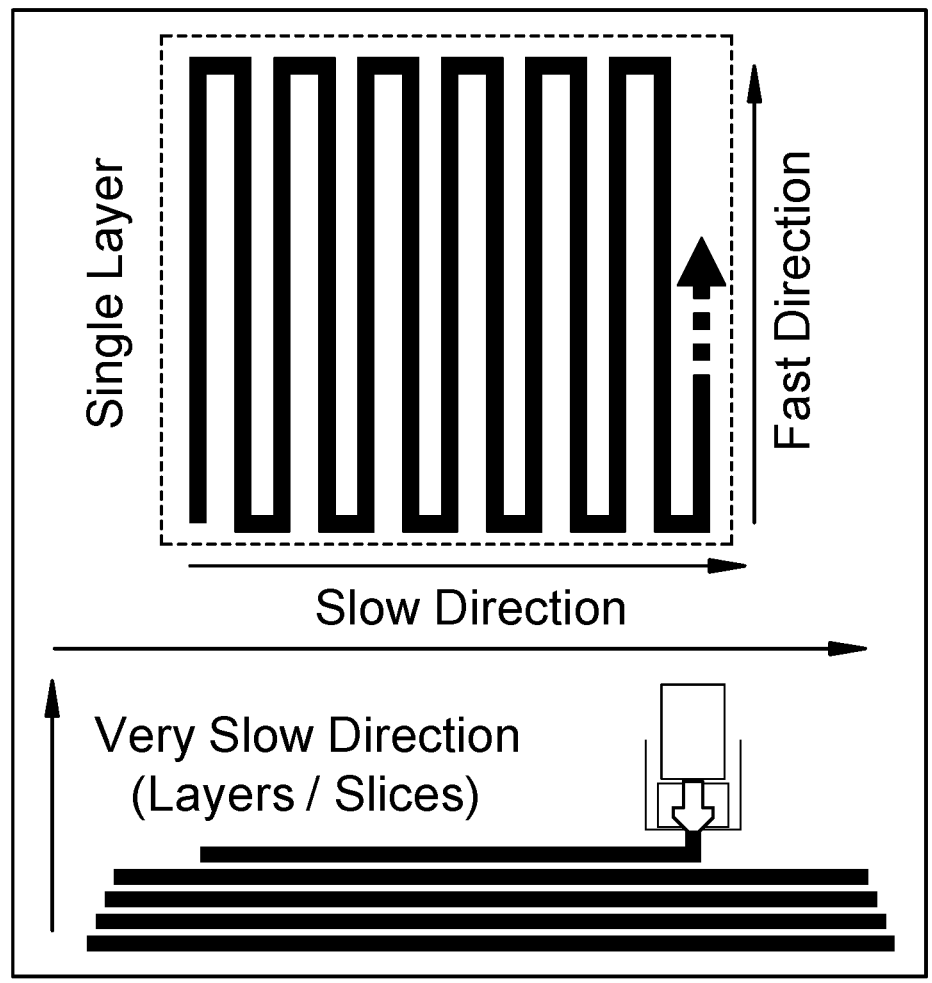
FIG. 12 is a schematic illustration of an exemplary additive manufacturing process showing speed of deposition within a layer and between layers for encoding an object according to the present disclosure.

Referring to FIG. 12, if one were to dissect a 3D printed object, one would talk about its construction with layers (slices in z-axis), and then within each layer there are lines which may be independent or some combination of x- and y-axes. Within this x-y plane, there is a fast direction (the current path of the extrusion) and a slow direction (usually, but not always, perpendicular to the extrusion direction). Typically, the critical dimensions in the build would be the width of a line (usually identical for x and y) and the thickness of a layer.

Within the physical limitations of the extruder, it may be desirable that the magnetic fields are generated with a spatial resolution smaller than the line width. In some cases this may not be practical because the lines in the slow dimension may have lower resolution since they will already have started cooling before being exposed to the magnetic field. The line resolution may be higher than in the fast direction where the lagging "melt pool" has more time for the coils to induce a magnetic effect.

Reading Resolution

Magnetometer reading resolution is dependent on many variables: device sensitivity (how many unique states it can discern), distance from object (the area seen by the magnetometer grows and sensitivity decreases), local magnetic fields, shielding, and angle to the local surface normal. These parameters act in concert to affect the ultimate reading of a given magnetic field strength and direction. Therefore, magnetic writing would optimally control the magnetic signature to make the reading job as easy as possible.

As discussed above, the AM process deposits volumes of material, and it is convenient to think of reading magnetic "voxels" (volumetric pixels) of a common magnetic field. For the purposes of reading resolution in the magnetic domain, one should consider the version of a voxel as a volume contained within the object which is composed of magnetic domains with a nominal read location defined in the local coordinate system (e.g. x, y, z; etc.). The type and sensitivity of the magnetometer will establish: (1) the scaler sensitivity—the maximum number of discretized magnitude values (4-bit, 8-bit, etc.); (2) the solid angle that will be integrated; and (3) the angular sensitivity—the maximum number of acceptable pointing angles, or how closely those solid angles can be spaced.

Due to signal processing limitations inherent by the Nyquist limit, the reading device should ideally be ~1.6× better than the writing resolution limit. Should this not be the case, signal processing strategies which utilize dwell time and/or multiple passes could be used to "enhance" the signal reading. Such strategies may take into account that the signal being read is static (fixed in the part).

Identifying Features

Practically, magnetic signatures can be read only when they are found. In order to make this non-trivial, one should consider identifying magnetic information locations in a part. Barcodes, for example, are easy to find on a package; invisible magnetic fields, on the other hand, may not.

Potential schemes that are useful include using one or more strong magnetic signatures to identify a reference frame from which to find the key magnetic information. These hot spots would be easily found through a low fidelity (fast) scan of the component.

Printing with Multiple Materials

It is common in the AM art to simultaneously use print heads each using different filament materials. This use of multiple filaments according to the present disclosure could add additional security to magnetic information that may be embedded within components. It also allows the possibility of creating additional unique states for detection.

In one possible embodiment, a part is printed using one ferromagnetic filament, and one standard ("non-magnetic") filament. Part authentication would leverage the ratio of areas of low magnetic susceptibility to those with high magnetic susceptibility at specific areas of the part. Non-magnetic material can be used as another state to measure, as an encapsulant to protect magnetic material in the object, or both.

In a second possible embodiment, a part is printed using one ferromagnetic filament and one diamagnetic filament. Interestingly, the ferromagnetic filament will retain a permanently imprinted magnetic field, while the diamagnetic filament would both not retain a field and also read a negative vector to an impinging field.

In summary, the advantage to embedding magnetic information into objects involves creating a large number of combinations for: geometries, materials, and magnetic characteristics. These combine to create a multi-level, unique signatures which are sensitive to tampering and force a great deal of effort to counterfeit (which may not even be possible).

Feed Materials

Currently there are only a small number of commercially available filaments that are doped with materials that can be magnetized. For example, commonly available brands are iron-doped thermoplastic filaments. Two of these materials were used in practical assessments and the results were similar. However, the results were not identical. These differences indicate the desire for investigating new dopant materials (cobalt, nickel, MnO, etc.) which are not yet commercially available.

It is furthermore noted that due to having an Iron dopant, the filament retains heat longer. It cools slightly more slowly than its undoped counterpart. This has practical implications on printing speed, printing temperature, and the localized effects of temperature on magnetic fields.

Limiting Magnetic Field Strength

As discussed above, during prototype testing using static magnetic field elements it was noted that above a certain strength of the magnet (e.g., magnetic field exerted on the material) the metallic (iron) particles were pulled out of position, or "dragged" through the material. This created undesirable effects of distortion of the printed object. Although the magnetic particles in this example were dragged to a localized region to create a stronger permanent magnetic signature, the object being printed became distorted and no longer met the dimensional objectives of the process.

Surface Fields versus Embedded Fields

Due to the nature of 3D printing, the print head has access to each volume element of the object. For the purposes of finding and reading these magnetic fields it may seem that these fields should be located in the surface layer of the print; however, for practical purposes this is may not be necessary.

Magnetic zones do not need to exist at the surface of the object to be found or read; simple methods, like the use of an orienting feature, can be used to locate these "hidden" fields. This allows the beneficial protection of the written magnetic fields from wear, environments, and also from tampering.

Figure 13:
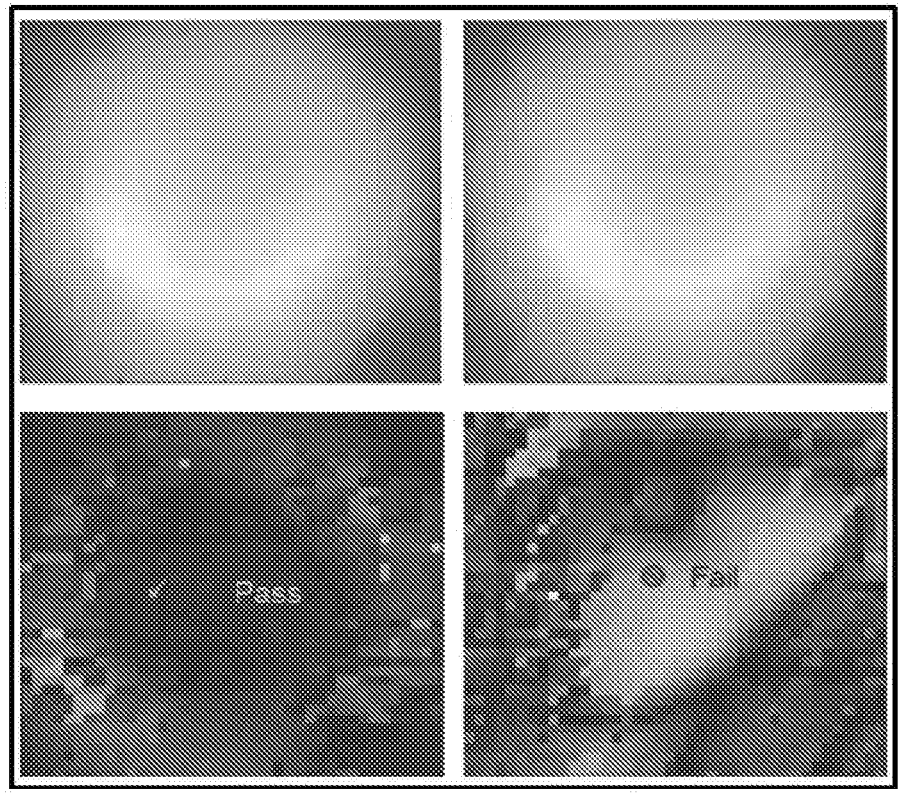
FIG. 13 is a post-processed image of magnetic signatures encoded in an object from experimental testing according to the present disclosure.

FIG. 13 illustrates one object with an embedded magnetic signature. On the top is the object's original signature as encoded. At the bottom left, the object was moved and rescanned. The difference between the original scan and the second scan were aligned and the difference was taken. Because the objects are magnetically stable, no significant residual is observed, the signatures only had subtle alignment differences as shown in the bottom left. That same object had its back surface scratched in an attempt to tamper with the object. When the object was scanned again and compared to the original signature, we see a measurable change (bottom right). This implies that the embedded information is capable of establishing if an object was tampered with or otherwise damaged.

Figure 14:
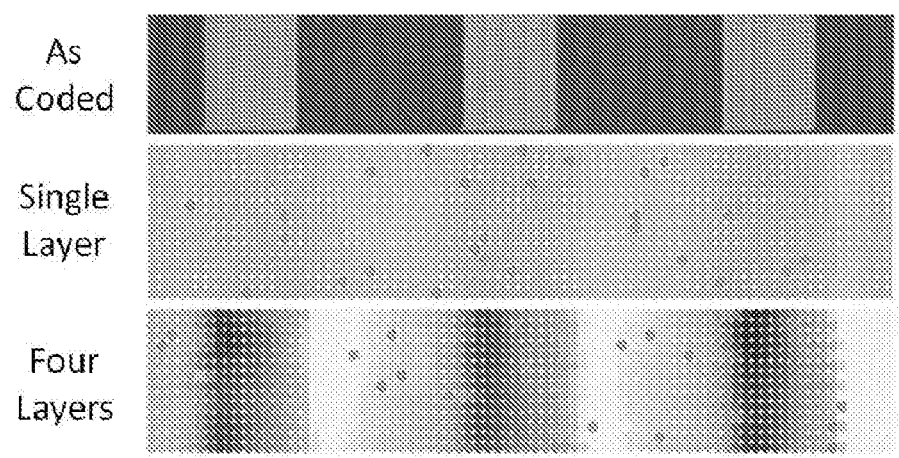
FIG. 14 is an illustration of information encoded in an object, including the as-coded information, and the post-processed images of the magnetically encoded information in the object at one, two and four layers.

Additionally, signatures can be strengthened by layering fields. FIG. 14 shows experimental data demonstrating that multiple aligned layers of identically coded information result in field strengthening. In the image, the field is significantly strengthened with four layers applied, the field has been strengthened and the zone edges have been sharpened.

Temperature

The glass transition temperature (Tg) is important to extrusion forms of 3D printing non-metallic (e.g., thermoplastic) materials. Below Tg the material is a relatively hard amorphous or semi-crystalline solids. Above Tg, these materials become viscous and can flow. This is in contrast to the melting temperature (Tm) of the non-metallic material, which is higher than Tg and refers to the true liquid state of the polymer.

Within families of polymers, we find Tg above or below that of room temperature. Hard, glass-like plastics have Tg values above room temperature. Pliable polymers have Tg values below room temperature. All plastics typically used in AM processes fall into the first category and require heat to be added to create flow conditions.

As these plastics rise above Tg they can be manipulated, but if they get too hot they can cross a Heat Damage Threshold (HDT). Above the material-specific HDT, as the plastic cools it is subject to undesirable conditions of shrinkage, slumping, and cracking.

Magnetics have their own set of critical temperatures. Primary among those is the Curie Temperature ($T_C$), and also the Néel Temperature ($T_N$). As discussed above, $T_N$ impacts anti-ferromagnetic materials, and above $T_N$ these materials become paramagnetic. This is because thermal energy has risen enough to destroy the magnetic ordering. $T_C$ is similar in nature, but impacts ferro- and ferrimagnetic materials. Above $T_C$ these materials also cross into paramagnetism.

$T_C$ and $T_N$ are rather impactful for consideration during materials selection and printing. When magnetic domains become paramagnetic they will either not permanently retain an applied magnetic field, or will do so at a significantly reduced level (that is, if the part cools fast enough to have some field exposure).

Figure 15B:
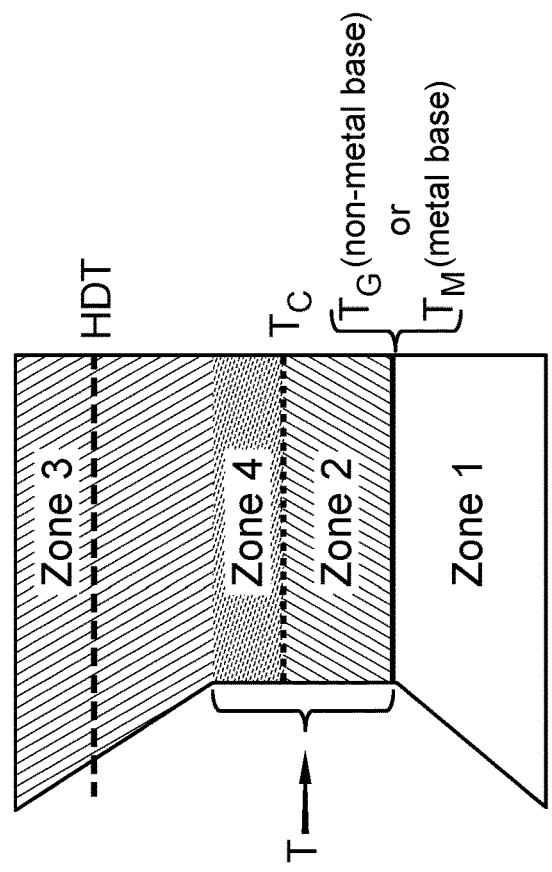
FIG. 15A and FIG. 15B illustrate exemplary temperature ranges for processing and encoding an object based upon the material's Curie Temperature, heat damage threshold temperature, and glass transition temperature.
Figure 15A:
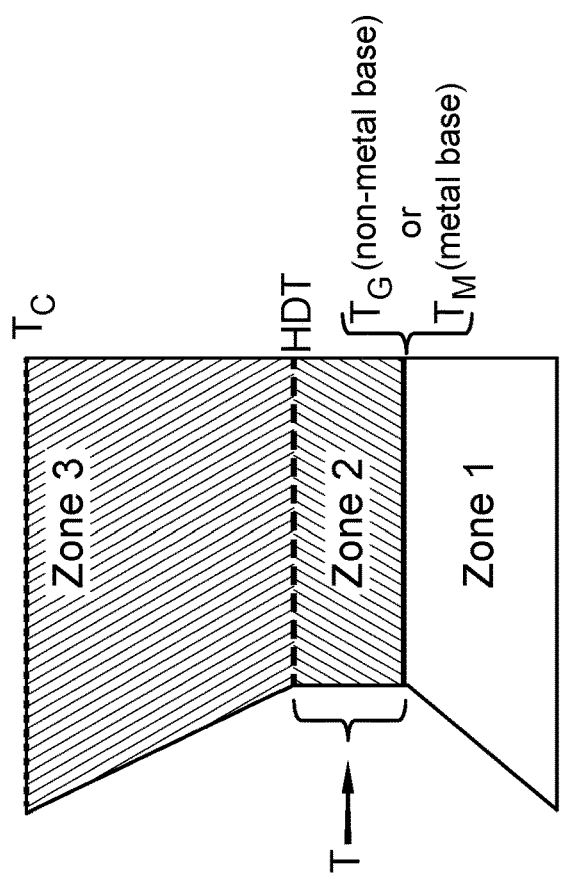

This imposes certain practical limits on the 3D printing process which are shown with exemplary reference to FIGS. 15A and 15B, in which the bracketed region "T" designates a nominal temperature range for encoding. In FIG. 15A, if $T_C$ is higher than HDT (Zone 3), then the printing thermal limits and temperature of encoding should be below HDT (e.g., Zone 2). As shown in Eq. 2, this will limit the susceptibility of the material, but this may be acceptable. FIG. 15B shows the opposite scenario, where $T_C$ is below HDT, in which case printing at or below $T_C$ (Zone 2) may be preferred, but it is understood that the acceptable range may extend slightly above $T_C$ (Zone 4), with the cooling constant taken into account (fast cooling means higher allowed printing temperature) and the dwell time of the magnetic field.

It is understood that encoding can be performed across a broad range of temperatures extending up to (or above) the Curie Temperature (Td). Above the glass transition temperature (Tg) for non-metallic (e.g., thermoplastic) materials, the base material is able to flow as desired during the exemplary additive manufacturing process (FIG. 2) with the nominal encoding temperature "T" between Tg and Tc (Zone 2). At lower temperatures magnetic fields of increasing strength may be required to induce equivalent magnetization of a voxel. When the induced magnetic field is weak, the induced magnetization of the voxel is less readable, but when the field is very strong and the temperature is above Tg, the magnetic particles can move through the base material causing changes to materials properties and/or cause undesirable distortions to the desired shape. Similarly, with metallic base materials, the melting temperature (Tm) also may be an important consideration for certain forms of additive manufacturing. As such, similar considerations may be made with respect to the nominal encoding temperature "T" for metallic base materials relative to the melting temperature (Tm) of the material, as shown with exemplary reference to FIGS. 15A and 15B where Tm may be considered for metallic base materials instead of Tg.

While it may be desirable to write at higher temperatures, it is also possible that a "writing head" can write onto the cooled line, or layer, of the material (metallic or non-metallic) to encode information (Zone 1). This may simplify some aspects of the write head, or due to processing method (e.g. laser sintering) may be the best processing in situ processing method available. In this scenario (e.g., Zone 1), higher magnetic fields may be required to obtain equivalent magnetization leading to the following possible results: diminished magnitude encoding resolution; diminished angular encoding resolution; diminished spatial resolution of encoding; higher likelihood of data corruption in adjacent voxels.

As noted above, it is also possible to encode the material (metallic or non-metallic) when the temperature is above the Curie temperature (Tc). For example, with reference to Zone 4 in FIG. 15B, it is possible to encode with a slightly modified scheme. This region has some pros (elimination of latent magnetization, and an ability to achieve higher magnetization of voxels) but also some cons (slower print speeds while waiting for material cooling, potentially lower spatial resolution, increased potential for remelt below active print layer, etc). The modified print scheme relies on specific knowledge of the base material rate of cooling thereby limiting the print head speed significantly.

Encoding

Where an organized field exists or is absent, 1D and 2D barcodes represent simple encoding standards to emulate, with no loss of generality. The utility of traditional barcodes are enhanced in the present application due to the covert nature of magnetic signatures.

Going above simple standard like bar codes would involve multi-level signals. An example of this, in the normal visual sense, would be a barcode having 256 gray levels. It would convey the current bar code product identification information as well as additional information in the form of the gray level information, or in other words it would store 256 times more information in the same area.

Aspects according to the present disclosure provide enhanced encoding in magnetic writing through the use of the multi-axis coil. Multi-level magnitude signals have been written into parts by varying the current passing through the inductive coil at the hot end of the extruder. This dimensionality for encoding information greatly increases the information that can be stored in a given voxel. Whereas each line or area element represented 1-bit of information previously, it may now contain multiple bits of information, increasing the information density dramatically. By using the same multi-axis coil system, it is also possible to add a vector pointing direction control, which allows for encoding even more information in the same voxel.

There were practical considerations discovered during the development of the 1-D electromagnetic coil (Example 2). These considerations (fill percentage, layer thickness, line width, and print speed) provide reasonable limits on the manufacturing process, and are addressed below.

A simple part may be built using a 100% fill factor using a boustrophedonic pattern (note: print pattern would likely change below 100% fill), as shown in FIG. 12, (top). This relatively simple approach builds layer after layer with constant thickness as shown in FIG. 12 (bottom). The speed of growth is slowest in layering direction, and within each layer there is a fast and slow direction (which represents the speed of print head motion in that direction).

From a magnetic signature standpoint, the present inventors found the following limitations to be true of the build. First, the layer thickness is equivalent to the resolution limit in the vertical dimension (10-100 µm, typical). Second, the extrusion line width is equivalent to the resolution limit in the "slow" direction (0.25-1.00 mm, typical). Finally, the resolution in the "fast" direction is limited by three factors: (1) the actual speed of the print head (mm/s), (2) cooling rate of the filament, and (3) the modulation frequency, or the frequency that the magnetic field can be changed from one arbitrary state to another (200 Hz would refer to 5 msec per transition).

First, the speed of the print head has relevance with regard to transition frequency. For example, a minimum encoded size of 0.050 mm (or 50 µm) in the fast direction will result assuming an arbitrary state transition takes 5 msec and the print head feeds at 10 mm/sec. Practically speaking, this may be smaller than the minimum read resolution of a relatively low cost, low performance, COTS magnetometer.

Second, the cooling rate of the filament relates to the physics of the particular polymer and its constituents (any dopants or other impurities contained therein). Experiments of the present disclosure with traditional and iron doped filaments show a significant elongation of the cooling period with the melt pool. This means the ferromagnetic particles have a higher magnetic susceptibility for a longer period of time. This has an upside and a downside. On the downside, it means the melt pool is susceptible to magnetic field manipulation for a longer period which may reduce the fidelity in any linear segment when the print head is moving slow relative to the cooling rate. On the upside, this can mean less magnetic energy is needed to induce a particular state when the print head is moving fast relative to the cooling rate.

Third, the modulation frequency is dependent on several factors. Speed and cooling time have an impact on choice of nominal frequency. The modulation frequency is driven by the rise/fall time of voltage on the coil, the required dwell time for the material (susceptibility), and to a lesser degree the magnetic encoding resolution enabled by the slicer software. Slicer software resolution is easily the most flexible of the three.

Part geometry may dominate the practicalities of magnetic printing when the simple (one-dimensional) example is considered. If the object is roughly box-like (e.g. parallelepiped, etc.) then it is possible to imprint a much higher density of magnetic information on the top and bottom (printed) surfaces than the side walls. This is due strictly to the geometric orientation of the magnetic field relative to the surface. The configuration of a magnetic reader may also drive its ability to read back magnetic information based on part geometry. A single axis read head will be challenged to measure a perpendicularly oriented field vector. Without turning the part, this read head could read information only from the top and bottom surfaces. Having multi-dimensionality in both the read and write process makes for a system with better overall capability. This built in flexibility seems wise since both must be able to adapt to any given part geometry.

In considering the spatial density of the top and bottom surfaces consideration should be given to the reading resolution. If the print device resolution is finer than the reading resolution, then it is possible to have many sub-regions (similar to a domain) within a voxel. This approach can allow for spatial averaging, where many magnitudes and angles can be combined to create signals. This technique, similar to convolution, can be chained together to improve the density of information where the reading resolution is worse than the writing resolution, or decoding information via a deconvolution process.

Magnitude and Angular Control

Figure 16:
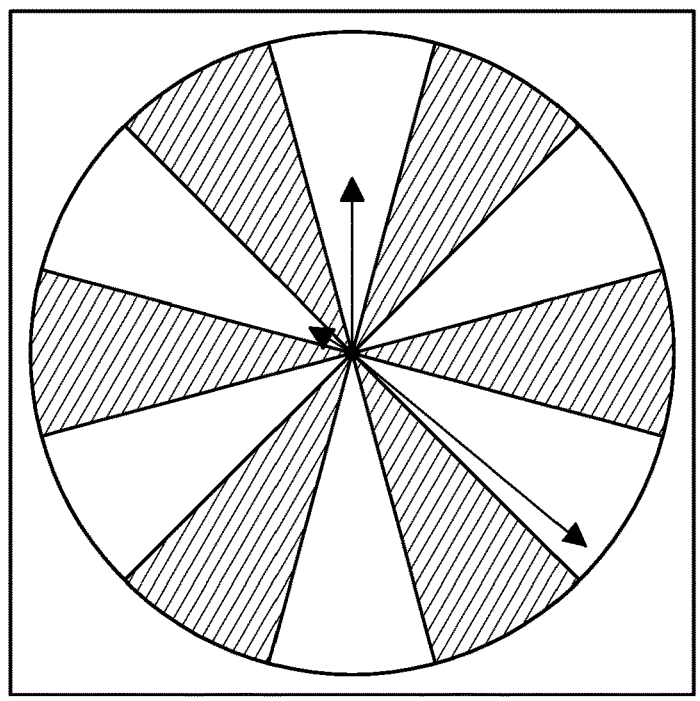
FIG. 16 is an illustration of encoded magnetic information arrayed to factor in angular sectors of a sphere with allocation of dead space, which may facilitate reading of the information.

A print head with 3-D magnetic encoding capability has the ability to imprint magnetic information in any direction ($4\pi$ steradian). This, in the context of the above, leads us to new items of consideration. Because we have the ability to encode in any orientation does not mean that reading this information will be easy; part geometry again may be a limiting factor. For example, printing a spherical part may force the magnetic information to be arrayed to factor in angular sectors with some allocation of dead space to allow reading to occur in an unambiguous manner, as shown in FIG. 16, for example. Dead space (e.g., shaded regions in FIG. 16) may serve as buffer space around magnetized regions to identify the region or to protect the integrity of a magnetic domain in an allowed region.

Figure 17:
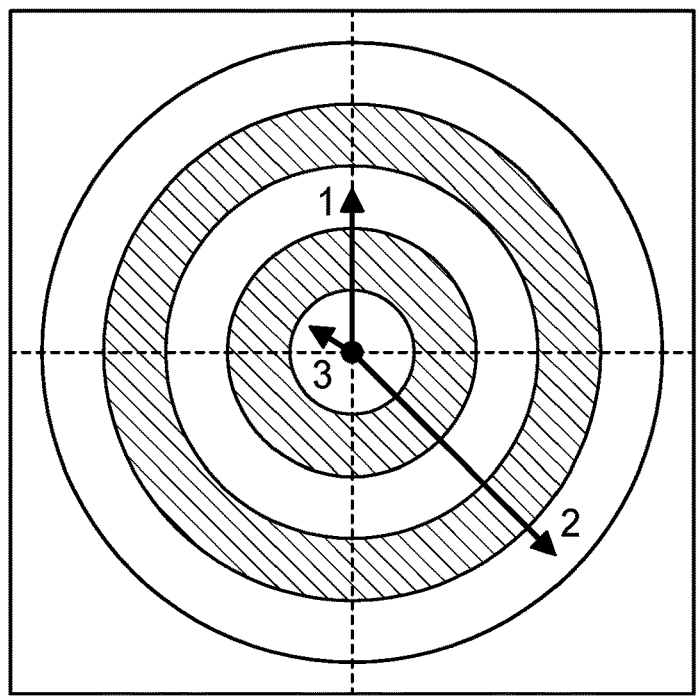
FIG. 17 is an illustration of encoded magnetic information that excludes magnetic magnitude regions, which may facilitate discretization in signal processing.

It should be obvious that FIG. 16 is heavily exaggerated to make a point and does not represent an observed or theoretical limitation on angle selection. As a practical visualization, a golf ball's surface is broken up into many area elements which contain boundary walls. In this analogy, the unallowed angles would be analogous to the boundary walls between dimples a golf ball. These example also identify that exploration space is needed to consider dead space in the form of un-allowed magnitudes as well (FIG. 17), though quantization error may address this innately. Excluded magnetic magnitude regions may usefully serve as thresholds in the discretization of a signal during analog-to-digital conversion of the reading process.

Encoding Information

It is easy to envision simple 1D or 2D binary encoded objects as the start point for embedding magnetic information into an AM part. Magnetic "barcodes" need not be visible to the human eye or traditional inventory control modes. Yet, to be useful, magnetically coded information should be just as reproducible as its traditional counterparts.

Straightforward methods for pushing magnetic encoded information methods further than is available to traditional methods has already been discussed above. Linear (1D) barcode formats have 1 bit state (0 or 1). Augmenting this with magnitude and/or vector directionality significantly increases the information density. For instance, augmenting a barcode with magnetic information including polarity (+ and −) four resolvable angles (say in the upper half sphere) to make 16 bits ($2^4$) of information available at each read location. Increasing information density from 1 bit to 16 bits using multi-dimensional information encoding has a significant impact to supply chain management and security.

Today's barcodes are intended for relatively simple geometries. AM processes increasingly yield part geometries that may not lend themselves well to barcoding. Standardized and spatially "regular" formats may not be useful in the future as they have been in the past due to the introduction of complex geometries. Embedding magnetic information in the AM process enables information to be distributed irregularly across a component's surface. The density of the information along with the flexibility of the marking process are flexible and attractive constructs.

Parts Identification, Damage and Detection of Tampering

During experimentation according to the present disclosure, multiple copies of the identical part were fabricated. Analyzing the signature over multiple parts enabled an early understanding of the signature's stability. What was learned is that there was a statistically significant differences in the noise of the measured signature. The conclusion of this test is that bulk production of parts (with process variation) yields signatures that are unique and stable. This indicates that production tolerances do not represent significant risk to the stability of the method—an important early knowledge point to understand.

During the course of the proof of concept evaluation, various samples were purposely damaged or otherwise modified. Using statistical analysis similar to the above, these components were identifiable as having been altered from the baseline print instructions. This means that parts damage, malicious or otherwise, can change a parts' signature in a measurable way. This opens up exploration of utilizing this method to identify many things that traditional bar codes are incapable of.

External Magnetic Fields

All the work discussed thus far has made use of localized magnetic fields. While this is practical for the purposes of thermoplastic extrusion, it may not be useful in other modes. Externally applied magnetic fields which encompass the entire print bed exhibit an alternative approach to printing.

FURTHER CONSIDERATIONS

While a preferred form or forms of the exemplary method, system, and/or apparatus for additively manufacturing and encoding a physical object has been described above, it should be apparent to those having ordinary skill in the art that other methods and system designs could also be used with the present invention. The invention is not limited to any particular AM method or system design, but rather is appropriate for a wide variety of AM methods and apparatus. For example, the present disclosure focuses on exemplary embodiments of AM processes that utilize doped thermoplastics. However, unique magnetic signatures can be formed in metal parts as well. Carrying magnetic signature concepts to the domain of metal components may be useful in aerospace applications, for example.

According to an aspect of the present disclosure, a method of encoding a physical object during additive manufacturing of the object includes: providing a computer model of the object that includes instructions to additively manufacture at least a portion of the object, and includes instructions to encode at least a portion of the object with information; additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and encoding the object with the information according to the model; wherein the encoding is performed during the additive manufacturing; and wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, and wherein, during the encoding, the magnetic vector direction and/or magnetic vector intensity of the external magnetic field is varied at the different spatial locations of the object to form a spatial array of different magnetic characteristics in the object that represents the encoded.

Embodiments according to the present disclosure may include one or more of the following additional features, separately or in any combination.

Each voxel of material that is exposed to the external magnetic field contains one or more magnetizable particles surrounded by base material, wherein each of the one or more magnetizable particles has the magnetic domains that are induced with permanent magnetism via exposure to the external magnetic field.

The external magnetic field is configured to induce the permanent magnetism into the magnetic domains of the one or more magnetizable particles independent of movement of the one or more magnetizable particles relative to the surrounding base material.

The varying the external magnetic field includes varying the magnetic vector direction of the magnetic field, such that the respectively exposed voxels exhibit a magnetic vector orientation within a 4π steradian solid angle.

Each respectively exposed voxel exhibits at least 1-bit, more preferably at least 2-bits, more preferably at least 8-bits, of information, based upon: (i) the magnetic vector orientation of the magnetic domains within a 4π steradian solid angle of the voxel, (ii) the magnetic vector intensity of the magnetic domains of the voxel, and (iii) the spatial location of the voxel in the object represented in three dimensions.

After the encoding, at least some of the respectively exposed voxels each have a different magnetic vector orientation within a different 4π steradian solid angle.

The object is made of a non-metallic base material having metallic particles contained therein; and wherein each voxel of the non-metallic base material exposed to the external magnetic field contains at least one metallic particle, each metallic particle having one or more of the magnetic domains that are induced with permanent magnetism via exposure to the external magnetic field.

The encoding includes inducing permanent magnetism into the magnetic domains of the respectively exposed metallic particles independent of movement of the metallic particles relative to the non-metallic base material.

The non-metallic base material has a glass transition temperature; and wherein encoding during the additive manufacturing includes heating the voxels of material above the glass transition temperature to a flowable state, and then exposing the metallic particles in the respectively heated voxels to the external magnetic field, such that upon cooling below the glass transition temperature the magnetic domains of the metallic particles remain permanently configured with a magnetic vector orientation in the same direction as the external magnetic field and/or with a magnetic vector intensity proportional to the intensity of the external magnetic field.

The non-metallic base material includes a polymeric material, such as: acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), epoxy, phenolic, or other similar polymeric materials.

The metallic particles include one or more of: a powder, a filing, and a fiber.

The metallic particle is made of a ferromagnetic or ferrimagnetic material, such as iron, nickel, cobalt, manganese, aluminum, rare earth metals, and/or alloys thereof.

The metallic particle is selected based upon its susceptibility to be induced with and retain permanent magnetism when exposed to the external magnetic field at the processing temperature of the additive manufacturing.

The object is made of a metallic base material, and wherein the magnetic domains are part of magnetic grains forming the metallic base material.

Encoding during the additive manufacturing includes heating the voxels of the metallic base material above a particular temperature, and then exposing the metallic grains in the respectively heated voxels to an external magnetic field, such that upon cooling below the particular temperature the magnetic domains of the metallic grains remain permanently configured with a magnetic vector orientation in the same direction as the external magnetic field and/or with a magnetic vector intensity proportional to the intensity of the external magnetic field.

The additive manufacturing includes one of: material extrusion and deposition, such as fused-filament fabrication; vat polymerization; material jetting; binder jetting; powder bed fusion, such as selective laser melting, selective laser sintering, direct metal laser sintering, and electron beam melting; laminated-based techniques, such as laminated object manufacturing; and direct energy deposition, such as laser engineered net shaping and direct metal deposition.

The resolution of the encoded information in the object is based upon one or more of: magnetic domain size, number of magnetic domains in a voxel, voxel size, number of voxels in a region, grain size and/or number of grains within a particle, particle size, number of metallic particles within a voxel, number of orientations of the magnetic vector in the particle and/or voxel, magnetic vector intensity of the magnetic domains in the voxel, number of dimensions of the object, external magnetic field size, direction and/or strength.

The information to encode in the object is predetermined, and wherein the encoded information in the object is fixed in the object to provide an immutable physical feature.

The encoded information represents one or more of: identification of the object, authentication as to the source of the object, traceability to the source of the object, data storage such as the object being a non-transitory computer readable medium having the encoded information, or the like.

The encoded information is decodable from the physical object by using a decoder, such as a magnetometer, for reading the different magnetic characteristics in the object; and wherein the method optionally further comprises a step of: decoding the encoded information, and optionally further comprises outputting the decoded information to a user.

According to another aspect of the present disclosure, a method of encoding a physical object during additive manufacturing of the object includes: providing a computer model of the object that includes instructions to additively manufacture at least a portion of the object, and includes instructions to encode at least a portion of the object; additively manufacturing the object according to the model, wherein the object is at least partially formed by a plurality of voxels of material disposed at different spatial locations of the object along three-dimensions; and encoding the object with the information according to the model; wherein the encoding is performed during the additive manufacturing; and wherein the encoding includes exposing at least some of the voxels at the different spatial locations of the object to the external magnetic field, the external magnetic field having a magnetic vector direction and a magnetic vector intensity that modifies the magnetic characteristic of the respective voxels at the different spatial locations of the object to form a spatial array of different magnetic characteristics in the object that represents the encoded information; wherein each respective voxel that has its magnetic characteristic modified contains at least one particle surrounded by base material, in which the at least one particle has magnetic domains that are modifiable via exposure to the external magnetic field to provide the modified magnetic characteristic of the voxel; and wherein the encoding includes modifying the magnetic characteristic of each respective voxel independent of movement of the at least one particle in the voxel relative to the surrounding base material.

According to another aspect of the present disclosure, a system for encoding a physical object during additive manufacturing of the object includes: a non-transitory computer readable medium containing instructions to additively manufacture at least a portion of the object, and containing instructions to encode at least a portion of the object with information; an additive manufacturing apparatus for additively manufacturing the object, wherein the additive manufacturing apparatus is configured to at least partially form the object with a plurality of voxels of material disposed at different spatial locations of the object along three-dimensions; an encoder configured to encode the information in the object during the additive manufacturing, the encoder comprising a magnetic field generator that generates an external magnetic field having a magnetic vector direction and a magnetic vector intensity; and a controller for controlling the additive manufacturing and the encoding, wherein the controller is configured to perform at least the steps of: during the additive manufacturing, exposing at least some of the voxels at the different spatial locations of the object to the external magnetic field, the magnetic vector direction and the magnetic vector intensity of the magnetic field being configured to induce permanent magnetism into the magnetic domains of the respectively exposed voxels, such that the magnetic domains retain a magnetic vector orientation in the same direction as the magnetic vector direction of the external magnetic field and/or retain a magnetic vector intensity proportional to the magnetic vector intensity of the external magnetic field, and during the encoding, varying the magnetic vector direction and/or magnetic vector intensity of the external magnetic field at the different spatial locations of the object to form a spatial array of different magnetic characteristics in the object that represents the encoded information.

According to another aspect of the present disclosure, a method of encoding a physical object includes: obtaining information to encode in the object; and processing the object, wherein during the processing, the magnetic characteristics of at least a portion of the object are modified at different spatial locations of the object to form a spatial array of different magnetic characteristics in the object that represents the encoded information.

Embodiments according to the present disclosure may include one or more of the following additional features, separately or in any combination.

The object is defined by a plurality of spatial units; and wherein at least some of the spatial units correspond to the different spatial locations of the object having the different magnetic properties.

The plurality of spatial units are volume units (voxels) that together define the object in three-dimensions; and wherein different voxels at the different spatial locations have different magnetic characteristics to represent the encoded information.

The magnetic characteristic is magnetic vector orientation and/or magnetic vector intensity; and each voxel is capable of exhibiting many different possible magnetic vector orientations, more particularly many possible orientations with a $4\pi$ steradian solid angle, and/or many possible magnetic vector intensities.

The object is made of a material with a non-metallic base; and metallic particles, such as a powder or fiber, are included in the non-metallic base, such as by being dispersed in the non-metallic base; or wherein the metallic particles are contained within sheets.

The processing includes one or more of: additive manufacturing, including: material extrusion and deposition (e.g., fused-deposition modelling or fused-filament fabrication), vat polymerization, material jetting, binder jetting, powder bed fusion (e.g., selective laser melting or selective laser sintering), laminated-based techniques (e.g., laminated object manufacturing), direct energy deposition, etc.; and extrusion or molding, including: thermoforming, compression and transfer molding, rotational molding and sintering, single or twin extrusion, die extrusion, injection molding, blow molding, etc.; and optionally, wherein the processing includes forming a new object or modifying an existing object.

The object is made of a material with metallic base, such as a ferromagnetic or ferrimagnetic material, for example iron, nickel, cobalt, manganese, aluminum, rare earth metals, and/or their respective alloys, or any other suitable ferromagnetic or ferrimagnetic material.

The processing includes one or more of: additive manufacturing, including: material jetting, powder bed fusion (e.g., direct metal laser sintering, electron beam melting, selective laser melting or selective laser sintering), laminated-based techniques (e.g., laminated object manufacturing), direct energy deposition (e.g., laser engineered net shaping, direct metal deposition), etc.; and melting, casting, molding, rolling, extruding, drawing, forging, sintering, welding (e.g., traditional or ultrasonic), heat treating, such as annealing tempering, etc.; and optionally, wherein the processing includes forming a new object or modifying an existing object.

According to another aspect of the present disclosure, a non-transitory machine readable medium comprising instructions which, when executed by at least one processor, cause the processor to carry out the method according to any of the foregoing.

Other aspects according to the present disclosure include encoding information, including one or more of: method to write magnetic signature in 3D printed part; method to write magnetic signature in a predetermined location within a 3D printed part; method to write magnetic signature in existing part by heating existing part to embed a signature; method to create a variable and complex magnetic signature within the same part and is dependent upon a complicated external field; external field can be reconfigurable to meet complex desired magnetic field that is pre-determined or determined during the manufacturing process; purpose may be for hardware identification; writing linear pixel information with 4PI options, area pixel information with 4PI options, and/or volume pixel information with 4PI options.

Other aspects according to the present disclosure include decoding information, including one or more of: read complex magnetic signature in physical printed part; read purpose may be for hardware identification; read linear pixel information with 4PI options; read area pixel information with 4PI options; read volume pixel information with 4PI options.

Other aspects according to the present disclosure include providing magnetic signatures, including one or more of: providing complex magnetic signature in physical printed is 4PI; purpose may be for hardware identification; provide magnetic signature with linear pixel information with 4PI options, area pixel information with 4PI options, and/or volume pixel information with 4PI options; magnetic signature can be pre-determined in whole or in part; magnetic signature can include random information in whole or part.

Other aspects according to the present disclosure include magnetic signature design for encoding, including one or more of: complex magnetic signature in physical printed is 4PI; can be modified based on magnetic field intensity, which could be embedded signal strength or different embedding material used; purpose may be for hardware identification; signature design may be linear pixel information, area pixel information, and/or volume pixel information; can be pre-determined in whole or in part; can be used to encode a large amount of information.

Other aspects according to the present disclosure include magnetic signature design with a method of encoding, including one or more of: compare to 1D, 2D barcode and extend to 3D; 3D signature of 4PI bits embedded within part structure to exponentially increase information density; complex magnetic signature in physical printed is 4PI; density is based on spatial resolution limits; linear pixel information, area pixel information, and/or volume pixel information; can be pre-determined in whole or in part; can be used to encode a large amount of information.

Other aspects according to the present disclosure include signature design for decoding, including one or more of: complex magnetic signature in physical part is 4PI; can be based on magnetic field intensity (can be a function of one or more parameters, like embedded signal strength, material used, etc.); purpose may be for hardware identification; linear pixel information, area pixel information, volume pixel information; can compare to pre-determined signature in whole or in part; can be used to decode a large amount of information.

Other aspects according to the present disclosure include signature design with method of decoding, including one or more of: compare to 1D, 2D barcode and extend to 3D; 3D signature of 4PI bits embedded within part structure to exponentially increase information density; complex magnetic signature in physical printed is 4PI; density is based on spatial resolution limits; linear pixel information; area pixel information; volume pixel information; can be pre-determined in whole or in part; can be used to decode a large amount of information.

It is understood that embodiments of the subject matter described in the present disclosure can be implemented in combination with digital electronic circuitry, controllers, processors, computer software, firmware, and/or hardware. For example, embodiments may be implemented in an additive manufacturing system or other processing apparatus that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network.

The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of encoding a physical object during additive manufacturing of the object, the method comprising:
   providing a computer model of the object that includes instructions to additively manufacture at least a portion of the object, and includes instructions to encode at least a portion of the object with information;
   additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and
   encoding the object with the information according to the model;
   wherein the encoding is performed during the additive manufacturing; and
   wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, wherein, during the encoding, the magnetic vector direction and/or magnetic vector intensity of the external magnetic field is varied at the different spatial locations of the object to form a spatial array of different magnetic characteristics in the object that represents the encoded;

wherein each voxel of material that is exposed to the external magnetic field contains one or more magnetizable particles surrounded by base material, wherein each of the one or more magnetizable particles has the magnetic domains that are induced with permanent magnetism via exposure to the external magnetic field; and wherein the external magnetic field is configured to induce the permanent magnetism into the magnetic domains of the one or more magnetizable particles independent of movement of the one or more magnetizable particles relative to the surrounding base material.

2. The method according to claim 1,
wherein the varying the external magnetic field includes varying the magnetic vector direction of the magnetic field, such that the respectively exposed voxels exhibit a magnetic vector orientation within a 4π steradian solid angle.

3. A method of encoding a physical object during additive manufacturing of the object, the method comprising:
providing a computer model of the object that includes instructions to additively manufacture at least a portion of the object, and includes instructions to encode at least a portion of the object with information;
additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field;
encoding the object with the information according to the model;
wherein the encoding is performed during the additive manufacturing; and
wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field,
wherein, during the encoding, the magnetic vector direction and/or magnetic vector intensity of the external magnetic field is varied at the different spatial locations of the object to form a spatial array of different magnetic characteristics in the object that represents the encoded; and wherein the varying the external magnetic field includes varying the magnetic vector direction of the magnetic field, such that the respectively exposed voxels exhibit a magnetic vector orientation within a 4π steradian solid angle;

wherein each respectively exposed voxel exhibits at least 2-bits, preferably at least 8-bits, of information, based upon: (i) the magnetic vector orientation of the magnetic domains within a 4π steradian solid angle of the voxel, (ii) the magnetic vector intensity of the magnetic domains of the voxel, and (iii) the spatial location of the voxel in the object represented in three dimensions.

4. The method according to claim 1, wherein after the encoding, at least some of the respectively exposed voxels each have a different magnetic vector orientation within a different 4π steradian solid angle.

5. The method according to claim 1,
wherein the object is made of a non-metallic base material having metallic particles contained therein; and
wherein each voxel of the non-metallic base material exposed to the external magnetic field contains at least one metallic particle, each metallic particle having one or more of the magnetic domains that are induced with permanent magnetism via exposure to the external magnetic field.

6. The method according to claim 5, wherein the encoding includes inducing permanent magnetism into the magnetic domains of the respectively exposed metallic particles independent of movement of the metallic particles relative to the non-metallic base material.

7. A method of encoding a physical object during additive manufacturing of the object, the method comprising:
providing a computer model of the object that includes instructions to additively manufacture at least a portion of the object, and includes instructions to encode at least a portion of the object with information;
additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and
encoding the object with the information according to the model;
wherein the encoding is performed during the additive manufacturing; and
wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, and
wherein, during the encoding, the magnetic vector direction and/or magnetic vector intensity of the external magnetic field is varied at the different spatial locations of the object to form a spatial array of different magnetic characteristics in the object that represents the encoded;
wherein the object is made of a non-metallic base material having metallic particles contained therein;
wherein each voxel of the non-metallic base material exposed to the external magnetic field contains at least one metallic particle, each metallic particle having one or more of the magnetic domains that are induced with permanent magnetism via exposure to the external magnetic field; and
wherein the non-metallic base material has a glass transition temperature; and
wherein encoding during the additive manufacturing includes heating the voxels of material above the glass transition temperature to a flowable state, and then exposing the metallic particles in the respectively heated voxels to the external magnetic field, with cooling below the glass transition temperature causing the magnetic domains of the metallic particles to remain permanently configured with a magnetic vector orientation in the same direction as the external magnetic field and/or with a magnetic vector intensity proportional to the intensity of the external magnetic field.

8. The method according to claim 5, wherein the non-metallic base material includes a polymeric material, such as: acrylonitrile-butadiene-styrene terpolymer (ABS), polycarbonate (PC), poly(meth)acrylate, polyphenylene sulfone (PPSU), polyethylene (PE), high-density polyethylene (HDPE), polyetherimide (PEI), polyetheretherketone (PEEK), polylactic acid (PLA), epoxy, phenolic, or other similar polymeric materials.

9. The method according to claim 5, wherein the metallic particles include one or more of: a powder, a filing, and a fiber; and
wherein the metallic particle is made of a ferromagnetic or ferrimagnetic material, such as iron, nickel, cobalt, manganese, aluminum, rare earth metals, and/or alloys thereof.

10. The method according to claim 5, wherein the metallic particle is selected based upon its susceptibility to be induced with and retain permanent magnetism when exposed to the external magnetic field at the processing temperature of the additive manufacturing.

11. A method of encoding a physical object during additive manufacturing of the object, the method comprising:
providing a computer model of the object that includes instructions to additively manufacture at least a portion of the object, and includes instructions to encode at least a portion of the object with information;
additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and
encoding the object with the information according to the model;
wherein the encoding is performed during the additive manufacturing;
wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, and wherein, during the encoding, the magnetic vector direction and/or magnetic vector intensity of the external magnetic field is varied at the different spatial locations of the object to form a spatial array of different magnetic characteristics in the object that represents the encoded; and
wherein the object is made of a metallic base material, and wherein the magnetic domains are part of magnetic grains forming the metallic base material.

12. The method according to claim 11, wherein encoding during the additive manufacturing includes heating the voxels of the metallic base material above a Curie temperature, and then exposing the metallic grains in the respectively heated voxels to an external magnetic field, with cooling below the Curie temperature causing the magnetic domains of the metallic grains to remain permanently configured with a magnetic vector orientation in the same direction as the external magnetic field and/or with a magnetic vector intensity proportional to the intensity of the external magnetic field.

13. The method according to claim 1, wherein the additive manufacturing includes one of: material extrusion and deposition, such as fused-filament fabrication; vat polymerization; material jetting; binder jetting; powder bed fusion, such as selective laser melting, selective laser sintering, direct metal laser sintering, and electron beam melting; laminated-based techniques, such as laminated object manufacturing; and direct energy deposition, such as laser engineered net shaping and direct metal deposition.

14. The method according to claim 1, wherein the resolution of the encoded information in the object is based upon one or more of: magnetic domain size, number of magnetic domains in a voxel, voxel size, number of voxels in a region, grain size and/or number of grains within a particle, particle size, number of metallic particles within a voxel, number of orientations of the magnetic vector in the particle and/or voxel, magnetic vector intensity of the magnetic domains in the voxel, number of dimensions of the object, external magnetic field size, direction and/or strength.

15. The method according to claim 1, wherein the information to encode in the object is predetermined, and wherein the encoded information in the object is fixed in the object to provide an immutable physical feature.

16. The method according to claim 1, wherein the encoded information represents one or more of: identification of the object, authentication as to the source of the object, traceability to the source of the object, data storage such as the object being a non-transitory computer readable medium having the encoded information, or the like.

17. The method according to claim 1, wherein the encoded information is decodable from the physical object by using a decoder, such as a magnetometer, for reading the different magnetic characteristics in the object; and
wherein the method optionally further comprises a step of: decoding the encoded information, and optionally further comprises outputting the decoded information to a user.

18. A method of encoding a physical object during additive manufacturing of the object, the method comprising:

provide a computer model of the object that includes instructions to additively manufacture at least a portion of the object, and includes instructions to encode at least a portion of the object with information;

additively manufacturing the object according to the model, wherein the object is at least partially formed by a plurality of voxels of material disposed at different spatial locations of the object along three-dimensions, each of the voxels having magnetic domains that are inducible with permanent magnetism via exposure to an external magnetic field; and encoding the object with the information according to the model;

wherein the encoding is performed during the additive manufacturing; and wherein the encoding includes exposing at least some of the voxels at the different spatial locations of the object to the external magnetic field, the external magnetic field having a magnetic vector direction and a magnetic vector intensity that induces permanent magnetism into the magnetic domains of the respectively exposed voxels, such that the magnetic domains configure and retain their magnetic vector orientation in the same direction as the magnetic vector direction of the external magnetic field and/or configure and retain their magnetic vector intensity proportional to the magnetic vector intensity of the external magnetic field, wherein, during the encoding, the magnetic vector direction and/or magnetic vector intensity of the external magnetic field is varied at the different spatial locations of the object to form a spatial array of different magnetic characteristics in the object that represents the encoded;

wherein the magnetic domains configure and retain their magnetic vector intensity proportional to the magnetic vector intensity of the external magnetic field.

* * * * *